US012710953B2

(12) United States Patent
Law et al.

(10) Patent No.: US 12,710,953 B2
(45) Date of Patent: Aug. 18, 2026

(54) SHARED DEVICE FIRMWARE UPDATE

(71) Applicant: Dell Products, L.P., Round Rock, TX (US)

(72) Inventors: Boon Kiat Law, Singapore (SG); Manish Krishnaji Desai, Singapore (SG)

(73) Assignee: Dell Products, L.P., Round Rock, TX (US)

( * ) Notice: Subject to any disclaimer, the term of this patent is extended or adjusted under 35 U.S.C. 154(b) by 358 days.

(21) Appl. No.: 18/483,033

(22) Filed: Oct. 9, 2023

(65) Prior Publication Data

US 2025/0117206 A1 Apr. 10, 2025

(51) Int. Cl.

| | |
|---|---|
| ***G06F 8/65*** | (2018.01) |
| ***H04L 9/08*** | (2006.01) |
| ***H04L 65/403*** | (2022.01) |

(52) U.S. Cl.

CPC .............. *G06F 8/65* (2013.01); *H04L 9/0863* (2013.01); *H04L 65/403* (2013.01)

(58) Field of Classification Search

CPC . G06F 8/61; G06F 8/65; H04L 65/403; H04L 9/0863

See application file for complete search history.

(56) References Cited

U.S. PATENT DOCUMENTS

| | | | | |
|---|---|---|---|---|
| 2002/0076042 | A1* | 6/2002 | Sandhu | H04L 63/045 380/30 |
| 2004/0260939 | A1* | 12/2004 | Ichikawa | G06F 21/53 713/168 |
| 2013/0279678 | A1* | 10/2013 | Beerse | H04M 3/2227 379/202.01 |
| 2014/0074570 | A1* | 3/2014 | Hope | G06Q 30/02 705/14.4 |
| 2018/0181238 | A1* | 6/2018 | Viswanath | G06F 3/048 |
| 2018/0343562 | A1* | 11/2018 | Nalukurthy | H04L 63/0838 |
| 2019/0306031 | A1* | 10/2019 | Tsukada | H04L 65/403 |
| 2020/0177561 | A1* | 6/2020 | Kruger | G06F 8/65 |
| 2021/0133689 | A1* | 5/2021 | Bedekar | H04L 12/283 |
| 2021/0405992 | A1* | 12/2021 | Bedekar | G16H 40/63 |
| 2024/0048440 | A1* | 2/2024 | Fu | H04L 41/0813 |
| 2025/0119462 | A1* | 4/2025 | Thiruchengode | H04L 65/403 |

* cited by examiner

*Primary Examiner* — Marina Lee
(74) *Attorney, Agent, or Firm* — Fogarty LLP

(57) ABSTRACT

The disclosure relates generally to firmware updates for conference room devices. When there is a firmware problem for a conference room device that needs fixing, it may result in the conference room sitting unused until an end user submits a ticket to information technology (IT). The present disclosure proposes a more proactive approach. For instance, a user may bring a laptop to a conference room for a meeting that uses a meeting application. The laptop may detect the presence of peripherals in the conference room and, in response, iterate through the different peripherals and discover current firmware version and health status for the peripherals. The laptop may then report to an IT server, for each peripheral, 1) peripheral identifier, 2) firmware version, 3) health status, 4) meeting room location. The IT server may then determine if any firmware fixes should be applied.

9 Claims, 17 Drawing Sheets

200

400C

400B

800B

SHARED DEVICE FIRMWARE UPDATE

FIELD

The present disclosure relates generally to device firmware updates and, more specifically, to firmware updates for conference room devices and shared workspace devices.

BACKGROUND

As the value and use of information continue to increase, individuals and businesses seek additional ways to process and store it. One option available to users is an Information Handling System (IHS). An IHS generally processes, compiles, stores, and/or communicates information or data for business, personal, or other purposes thereby allowing users to take advantage of the value of the information.

Because technology and information handling needs and requirements vary between different users or applications, IHSs may also vary regarding what information is handled, how the information is handled, how much information is processed, stored, or communicated, and how quickly and efficiently the information may be processed, stored, or communicated.

Variations in IHSs allow for IHSs to be general or configured for a specific user or specific use, such as financial transaction processing, airline reservations, enterprise data storage, or global communications. In addition, IHSs may include a variety of hardware and software components that may be configured to process, store, and communicate information and may include one or more computer systems, data storage systems, and networking systems.

SUMMARY

Systems and methods for providing firmware updates to peripheral devices are described. In an illustrative, non-limiting embodiment, a method includes: connecting a user device to a plurality of shared peripheral devices in a conference room or shared workspace, wherein the shared peripheral devices are not configured for connection to any network; establishing a network connection with a cloud-based management service, wherein the management service is pre-populated with data regarding the plurality of shared peripheral devices and a plurality of conference rooms or shared workspaces that includes the conference room or shared workspace; retrieving firmware version information from the plurality of shared peripheral devices; transmitting the firmware version information to the cloud-based management service over the network connection; and transmitting location information of the plurality of shared peripheral devices to the cloud-based management service over the network connection.

In another illustrative, non-limiting embodiment, an Information Handling System (IHS), includes: one or more processors; and a memory coupled to the one or more processors, wherein the memory comprises computer-readable instructions, which upon execution by the one or more processors, causes the IHS to: analyze information regarding a plurality of conference rooms under management by a cloud-based management service, including identifying a first conference room having a plurality of peripheral devices, wherein a first peripheral device of the plurality of peripheral devices is identified as malfunctioning by the information regarding the plurality of conference rooms, and wherein the first peripheral device is not configured for network communication; search a plurality of conference room bookings to determine an identity of a user who has booked the first conference room; and coordinate with the user to apply a remediation package to the first peripheral device, wherein applying the remediation package to the first peripheral device employs a physical presence of a user device, associated with the user, in the conference room.

In yet another illustrative, non-limiting embodiment, a non-transitory computer-readable storage device having instructions stored thereon for peripheral device remediation, wherein execution of the instructions by one or more processors of an IHS (Information Handling System) causes the one or more processors to: analyze information regarding a plurality of conference rooms under management by a cloud-based management service, including identifying a first conference room having a plurality of peripheral devices, wherein a first peripheral device of the plurality of peripheral devices is identified as malfunctioning in the information regarding the plurality of conference rooms, and wherein the first peripheral device is not configured for network communication; search a plurality of conference room bookings to determine an identity of a user who has booked the first conference room; and coordinate with the user to apply a remediation package to the first peripheral device, wherein applying the remediation package to the first peripheral device employs a physical presence of a user device, associated with the user, in the conference room.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity and have not necessarily been drawn to scale.

DETAILED DESCRIPTION

Figure 1:
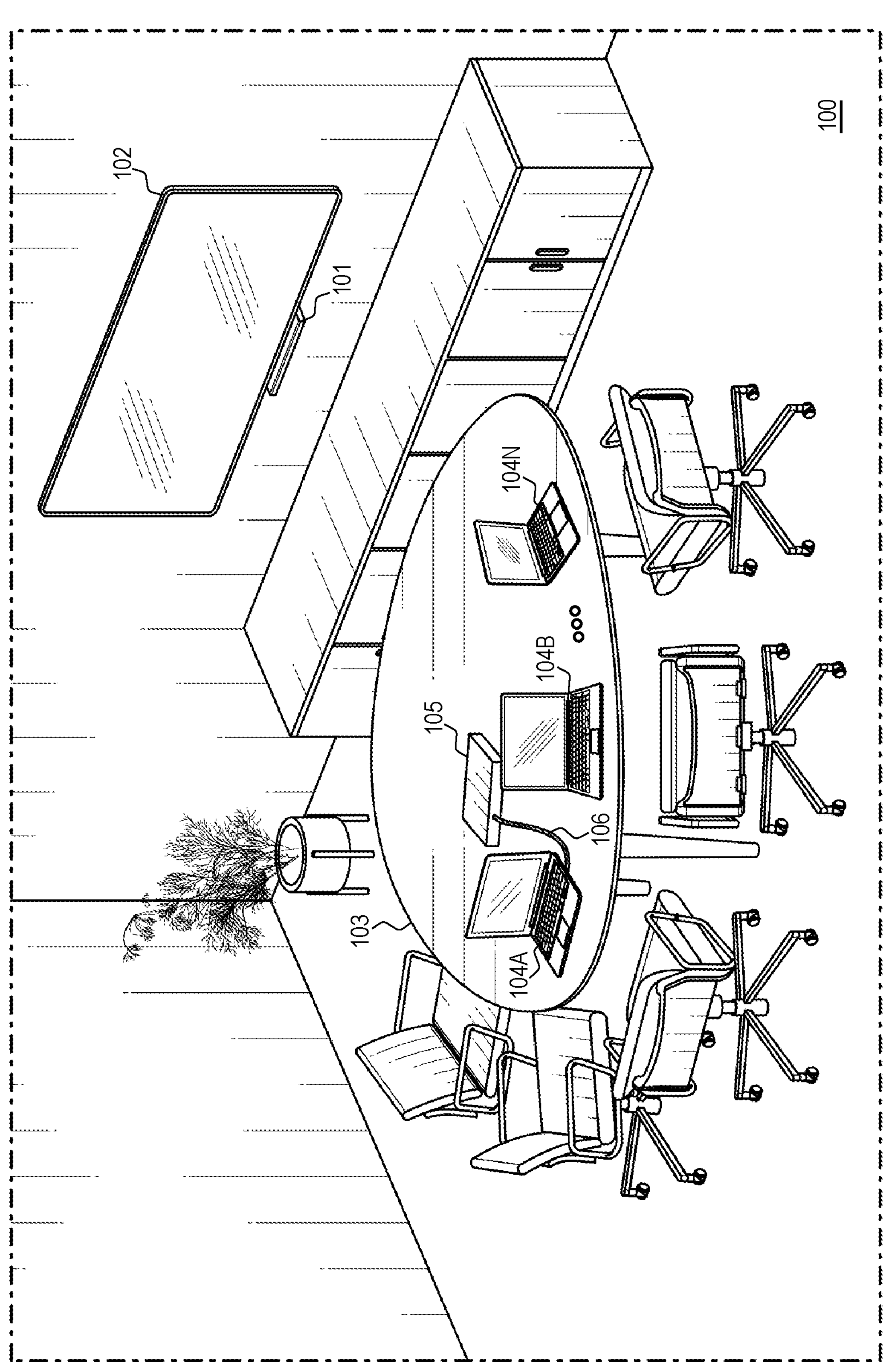
FIG. 1 is a diagram illustrating an example of a remote conference or meeting room, according to some embodiments.

For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smartphone), server (e.g., blade server or rack server), a network storage device, or any other suitable device and may vary in size, shape, performance, functionality, and price.

An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, a touchscreen, and/or a video display. An IHS may also include one or more buses operable to transmit communications between the various hardware components.

As used herein, the terms "heterogenous computing platform," "heterogenous processor," or "heterogenous platform," and other like terms, as used herein, generally refer to various types of Integrated Circuit (ICs) or chips (e.g., a System-On-Chip or "SoC," a Field-Programmable Gate Array or "FPGA," an Application-Specific Integrated Circuit or "ASIC," etc.) containing a plurality of discrete processing circuits or semiconductor Intellectual Property (IP) cores (collectively referred to as "SoC devices" or simply "devices") in a single electronic or semiconductor package, where each device may have different processing capabilities suitable for handling a corresponding type of computational task. Examples of heterogeneous processors include, but are not limited to: QUALCOMM's SNAPDRAGON, SAMSUNG's EXYNOS, APPLE's "A" SERIES, etc.

The terms "conferencing session," "collaboration session," "remote conferencing," "web conferencing," "teleconferencing," "videoconferencing," "remote communication," "remote collaboration," "virtual collaboration," "virtual meeting," "remote meeting," and other like terms, as used herein, generally refer to various types of electronic meeting, conferencing, or collaborative interactions among clients, users, or employees (collectively referred to as "users" or "IHS users"). These interactions may include, but are not limited to: meetings, broadcasts, training events, lectures, presentations, etc. (collectively referred to as "remote meetings").

In modern implementations, a remote meeting may employ several different technologies, including Unified Communication (UC) applications and services (e.g., ZOOM, TEAMS, SKYPE, FACETIME, etc.), robust (and/or lightweight) protocols, data encryption and compression techniques, etc., to enable the exchange of streams of text messages, voice, video, and/or other electronic data (e.g., files, documents, etc.) in real-time among remote users in dispersed locations.

When at work, for example, a client, user, or employee (collectively referred to as "user" or "IHS user") may participate in a remote meeting from their desk. Alternatively, the user may participate in a remote meeting from a conference room (e.g., in an office building). For example, a user may travel to the conference room carrying the IHS they intend to use. Upon arrival at the conference room, the user may also find multiple resources or devices (e.g., large displays, high-resolution cameras, whiteboards, etc.) available to them as well to any other local participants of the remote meeting.

Furthermore, "hoteling," "office hoteling," "shared workspaces," and "co-working spaces" are examples of environments where users schedule their hourly, daily, or weekly use of individual workspaces, such as office desks, cubicles, or conference rooms, as an alternative to permanently assigned seating. Users can access a reservation system to book an individual workspace before they arrive at work, which gives them freedom and flexibility. In some cases, individual workspaces may also be available to users without a reservation system on a first-come, first-serve basis (e.g., in the lobby of a hotel). While a user spends their allotted time in an individual workspace, they may also participate in one or more remote meetings.

FIG. 1 is a diagram illustrating an example of remote conference or meeting room 100, or any workspace equipped with similar remote meeting capabilities. In some cases, remote conference or meeting room 100 may have multiple intended uses, and it may be accessible to users on a first-come-first-serve basis without users having to schedule it through a reservation system. Alternatively, remote conference or meeting room 100 may be exclusively dedicated to remote meetings and may be accessible by reservation only.

As shown, remote conference or meeting room 100 includes video bar 101 coupled to shared or external display(s) 102, such that users may sit around table 103 and operate their respective IHSs 104A-N (sometimes referred to as "client devices" or client IHSs) to conduct and/or participate in remote conferences or meetings. It should be noted, however that the exact configuration of conference or meeting room 100 shown in FIG. 1 may include many variations.

For example, in some cases, video bar 101 may not be located adjacent to shared or external display(s) 102 (e.g., on table 103, another wall of room 100, etc.). In other cases, two or more shared or external displays 102 may be provided. Yet in other cases, speakers and microphones may be distributed across room 100.

Video bar 101 may include a conference or video camera, audio speakers, and/or microphones, typically housed within a single enclosure. In some implementations, video bar 101 may include an SoC, or the like, with computing capabilities that allow it to be used as an all-in-one solution for video-conferencing. To that end, video bar 101 may be configured with any software application that supports video and audio drivers, including UC applications.

In certain implementations, however, video bar 101 may be coupled to an in-room or host IHS (e.g., device 105) configured to support its operations and/or perform at least a portion of the computations not directly performed by video bar 101 in order to enable remote meetings.

One or more of IHSs 104A-N may be coupled via cable 106 (or wirelessly) to in-room device 105. An IHS (e.g., IHS 104A) coupled to device 105 may make use of shared or external display(s) 102 in addition to, or as an alternative to, that IHS's integrated display.

In-room device 105 may include a touch controller, in-room or host IHS, device hub, or the like. For instance, when in-room device 105 includes a touch controller (e.g., an IHS with a table form factor), it may be used by any user of IHSs 104A-N to start and end a remote meeting, to modify certain application settings (e.g., enable screen sharing or text transcript), to reserve additional meeting time, to manage recordings and documents, to upgrade software or firmware, to add or remove peripherals, and so on.

To that end, video bar 101 (and/or host IHS 105A) may be configured to implement, execute, or instantiate an On-the-Box (OTB) agent configured to interface with a UC application or service during a remote meeting. Meanwhile, each of IHSs 104A-N may be configured to implement, execute, or instantiate a respective client IHS agent configured to interface with the UC application (or its local instance of it) or service during the remote meeting.

In various implementations, systems and methods described herein may be executed, at least in part, through interactions between the OTB agent and one or more client IHS agents. In some cases, these interactions between among the OTB agent and one or more client IHS agents may be supported by, or involve the cooperation of, one or more cloud-based services.

In operation, video bar 101 and/or in-room IHS 105 may be configured to receive images obtained with one or more camera(s) located in room 100 and to share those images with remote participants of a remote meeting (e.g., as live-video images) using the UC application and service. Additionally, or alternatively, video bar 101 and/or in-room IHS 105 may be configured to receive images from remote participants (or shared documents, etc.) and to display those images to local participants of the remote meeting in on one or more displays(s) in room 100 using the UC application and service.

Video bar 101 and/or in-room IHS 105 may also be configured to receive audio captured with one or more microphones(s) located in room 100 and to share that audio with remote participants of the remote meeting using the UC application and service. Video bar 101 and/or in-room IHS 105 may be further configured to receive audio captured from remote participants and to reproduce that audio to local participants of the remote meeting via one or more speakers(s) in room 100 using the UC application and service. Moreover, video bar 101 and/or in-room IHS 105 may be configured to receive a screen capture from a digital whiteboard and to share that screen capture with remote participants of the remote meeting using the UC application and service.

Figure 2:
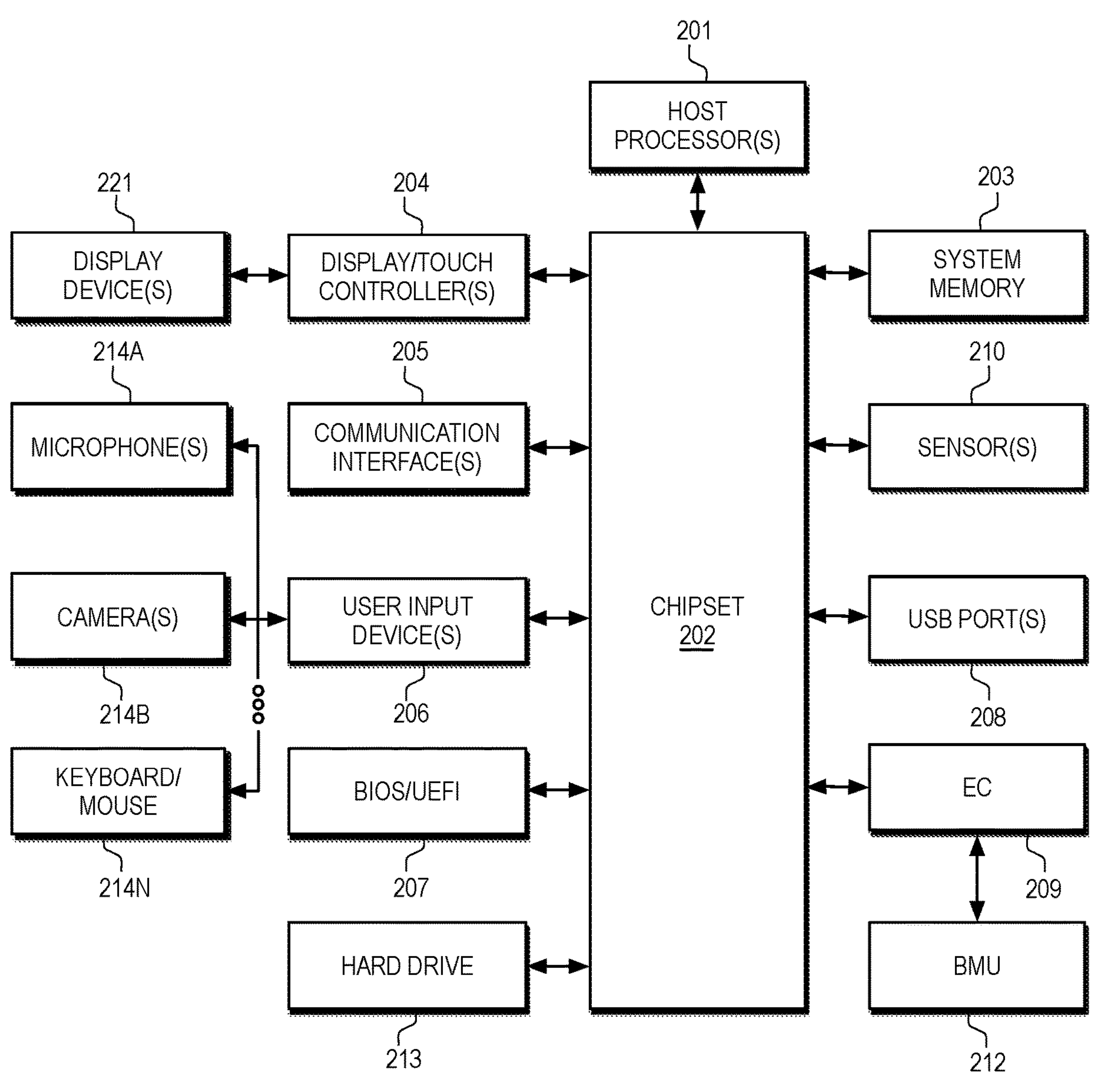
FIG. 2 is a diagram illustrating examples of components of an Information Handling System (IHS), according to some embodiments.

FIG. 2 is a block diagram of components of IHS 200. In various embodiments, IHS 200 may be used to implement aspects of IHSs 104A-N, video bar 101, and/or in-room device 105. As depicted, IHS 200 includes host processor(s) 201.

IHS 200 may be a single-processor system or a multi-processor system including two or more processors. Host processor(s) 201 may include any processor capable of executing program instructions, such as an INTEL/AMD x86 processor, or any general-purpose or embedded processor implementing any of a variety of Instruction Set Architectures (ISAs), such as a Complex Instruction Set Computer (CISC) ISA, a Reduced Instruction Set Computer (RISC) ISA (e.g., one or more ARM core(s), or the like).

IHS 200 includes chipset 202 coupled to host processor(s) 201. Chipset 202 may provide host processor(s) 201 with access to several resources. In some cases, chipset 202 may utilize a QuickPath Interconnect (QPI) bus to communicate with host processor(s) 201. Chipset 202 may also be coupled to communication interface(s) 205 to enable communications between IHS 200 and various wired and/or wireless devices or networks, such as Ethernet, WiFi, BLUETOOTH (BT), BT Low-Energy (BLE), cellular or mobile networks (e.g., Code-Division Multiple Access or "CDMA," Time-Division Multiple Access or "TDMA," Long-Term Evolution or "LTE," etc.), satellite networks, or the like.

Communication interface(s) 205 may be used to communicate with peripherals devices (e.g., BT speakers, microphones, headsets, etc.). Moreover, communication interface(s) 205 may be coupled to chipset 202 via a Peripheral Component Interconnect Express (PCIe) bus, or the like.

Chipset 202 may be coupled to display and/or touchscreen controller(s) 204, which may include one or more or Graphics Processor Units (GPUs) on a graphics bus, such as an Accelerated Graphics Port (AGP) or PCIe bus. As shown, display controller(s) 204 provide video or display signals to one or more display device(s) 211.

Display device(s) 211 may include Liquid Crystal Display (LCD), light-emitting diode (LED), organic LED (OLED), or other thin film display technologies. Display device(s) 211 may include a plurality of pixels arranged in a matrix, configured to display visual information, such as text, two-dimensional images, video, three-dimensional images, etc. In some cases, display device(s) 211 may be provided as a single continuous display, rather than two discrete displays.

Chipset 202 may provide host processor(s) 201 and/or display controller(s) 204 with access to system memory 203. In various implementations, system memory 203 may be implemented using any other suitable memory technology, such as static RAM (SRAM), dynamic RAM (DRAM) or magnetic disks, or any nonvolatile/Flash-type memory, such as a Solid-State Drive (SSD), Non-Volatile Memory Express (NVMe), or the like.

In certain embodiments, chipset 202 may also provide host processor(s) 201 with access to one or more Universal Serial Bus (USB) ports 208, to which one or more peripheral devices may be coupled (e.g., integrated or external webcams, microphones, speakers, etc.).

Chipset 202 may further provide host processor(s) 201 with access to one or more hard disk drives, solid-state drives, optical drives, or other removable-media drives 213.

Chipset 202 may also provide access to one or more user input devices 206, for example, using a super I/O controller or the like. Examples of user input devices 206 include, but are not limited to, microphone(s) 214A, camera(s) 214B, and keyboard/mouse 214N. Other user input devices 206 may include a touchpad, stylus or active pen, totem, etc.

Each of user input devices 206 may include a respective controller (e.g., a touchpad may have its own touchpad controller) that interfaces with chipset 202 through a wired or wireless connection (e.g., via communication interfaces(s) 205). In some cases, chipset 202 may also provide access to one or more user output devices (e.g., video projectors, paper printers, 3D printers, loudspeakers, audio headsets, Virtual/Augmented Reality (VR/AR) devices, etc.).

In certain implementations, chipset 202 may provide an interface for communications with one or more hardware sensors 220. Sensors 220 may be disposed on or within the chassis of IHS 200, or otherwise coupled to IHS 200, and may include, but are not limited to, electric, magnetic, radio, optical (e.g., camera, webcam, etc.), infrared, thermal, force, pressure, acoustic (e.g., microphone), ultrasonic, proximity, position, deformation, bending, direction, movement, velocity, rotation, gyroscope, Inertial Measurement Unit (IMU), and/or acceleration sensor(s).

BIOS 207 is coupled to chipset 202. UEFI was designed as a successor to BIOS, and many modern IHSs utilize UEFI in addition to or instead of the BIOS. Accordingly, BIOS/UEFI 207 is intended to also encompass corresponding UEFI component(s). BIOS/UEFI 207 provides an abstraction layer that allows the OS to interface with certain hardware components that are utilized by IHS 200.

Upon booting of IHS 200, host processor(s) 201 may utilize program instructions of BIOS 207 to initialize and test hardware components coupled to IHS 200, and to load host OS 300 for use by IHS 200. Via the hardware abstraction layer provided by BIOS/UEFI 207, software stored in system memory 203 and executed by host processor(s) 201 can interface with certain I/O devices that are coupled to IHS 200.

Embedded Controller (EC) 209 (sometimes referred to as a Baseboard Management Controller or "BMC") includes a microcontroller unit or processing core dedicated to handling selected IHS operations not ordinarily handled by host processor(s) 201. Examples of such operations may include, but are not limited to, power sequencing, power management, receiving and processing signals from a keyboard or touchpad, as well as other buttons and switches (e.g., power button, laptop lid switch, etc.), receiving and processing thermal measurements (e.g., performing cooling fan control, CPU and GPU throttling, and emergency shutdown), controlling indicator Light-Emitting Diodes or "LEDs" (e.g., caps lock, scroll lock, num lock, battery, ac, power, wireless LAN, sleep, etc.), managing the battery charger and the battery, enabling remote management, diagnostics, and remediation over network(s) 203, etc.

Unlike other devices in IHS 200, EC 209 may be made operational from the very start of each power reset, before other devices are fully running or powered on. As such, EC 209 may be responsible for interfacing with a power adapter to manage the power consumption of IHS 200. These operations may be utilized to determine the power status of IHS 200, such as whether IHS 200 is operating from battery power or is plugged into an AC power source. Firmware instructions utilized by EC 209 may be used to manage other core operations of IHS 200 (e.g., turbo modes, maximum operating clock frequencies of certain components, etc.).

In some cases, EC 209 may implement operations for detecting certain changes to the physical configuration or posture of IHS 200 and managing other devices in different configurations of IHS 200. For instance, when IHS 200 has a 2-in-1 laptop/tablet form factor, EC 209 may receive inputs from a lid position or hinge angle sensor 220, and it may use those inputs to determine: whether the two sides of IHS 200 have been latched together to a closed position or a tablet position, the magnitude of a hinge or lid angle, etc. In response to these changes, the EC may enable or disable certain features of IHS 200 (e.g., front or rear-facing camera, etc.).

In this manner, EC 209 may identify any number of IHS postures, including, but not limited to: laptop, stand, tablet, or book. For example, when display(s) 211 of IHS 200 is open with respect to a horizontal keyboard portion, and the keyboard is facing up, EC 209 may determine IHS 200 to be in a laptop posture. When display(s) 211 of IHS 200 is open with respect to the horizontal keyboard portion, but the keyboard is facing down (e.g., its keys are against the top surface of a table), EC 209 may determine IHS 200 to be in its stand posture. When the back of display(s) 211 is closed against the back of the keyboard portion, EC 209 may determine IHS 200 to be in a tablet posture. When IHS 200 has two display(s) 211 open side-by-side, EC 209 may determine IHS 200 to be in a book posture. In some implementations, EC 209 may also determine if display(s) 211 of IHS 200 are in a landscape or portrait orientation.

In some implementations, EC 209 may be installed as a Trusted Execution Environment (TEE) component to the motherboard of IHS 200. Additionally, or alternatively, EC 209 may be further configured to calculate hashes or signatures that uniquely identify individual components of IHS 200. In such scenarios, EC 209 may calculate a hash value based on the configuration of a hardware and/or software component coupled to IHS 200. For instance, EC 209 may calculate a hash value based on all firmware and other code or settings stored in an onboard memory of a hardware component.

Hash values may be calculated as part of a trusted process of manufacturing IHS 200 and may be maintained in secure storage as a reference signature. EC 209 may later recalculate the hash value for a component and may compare it against the reference hash value to determine if any modifications have been made to the component, thus indicating that the component has been compromised. As such, EC 209 may validate the integrity of hardware and software components installed in IHS 200.

In addition, EC 209 may provide an OOB channel that allows an Information Technology Decision Maker (ITDM) or Original Equipment Manufacturer (OEM) to manage IHS 200's various settings and configurations, for example, by issuing Out-of-Band (OOB) commands.

In various embodiments, IHS 200 may be coupled to an external power source through an AC adapter, power brick, or the like. The AC adapter may be removably coupled to a battery charge controller to provide IHS 200 with a source of DC power provided by battery cells of a battery system in the form of a battery pack (e.g., a lithium-ion or "Li-ion" battery pack, or a nickel metal hydride or "NiMH" battery pack including one or more rechargeable batteries).

Figure 3:
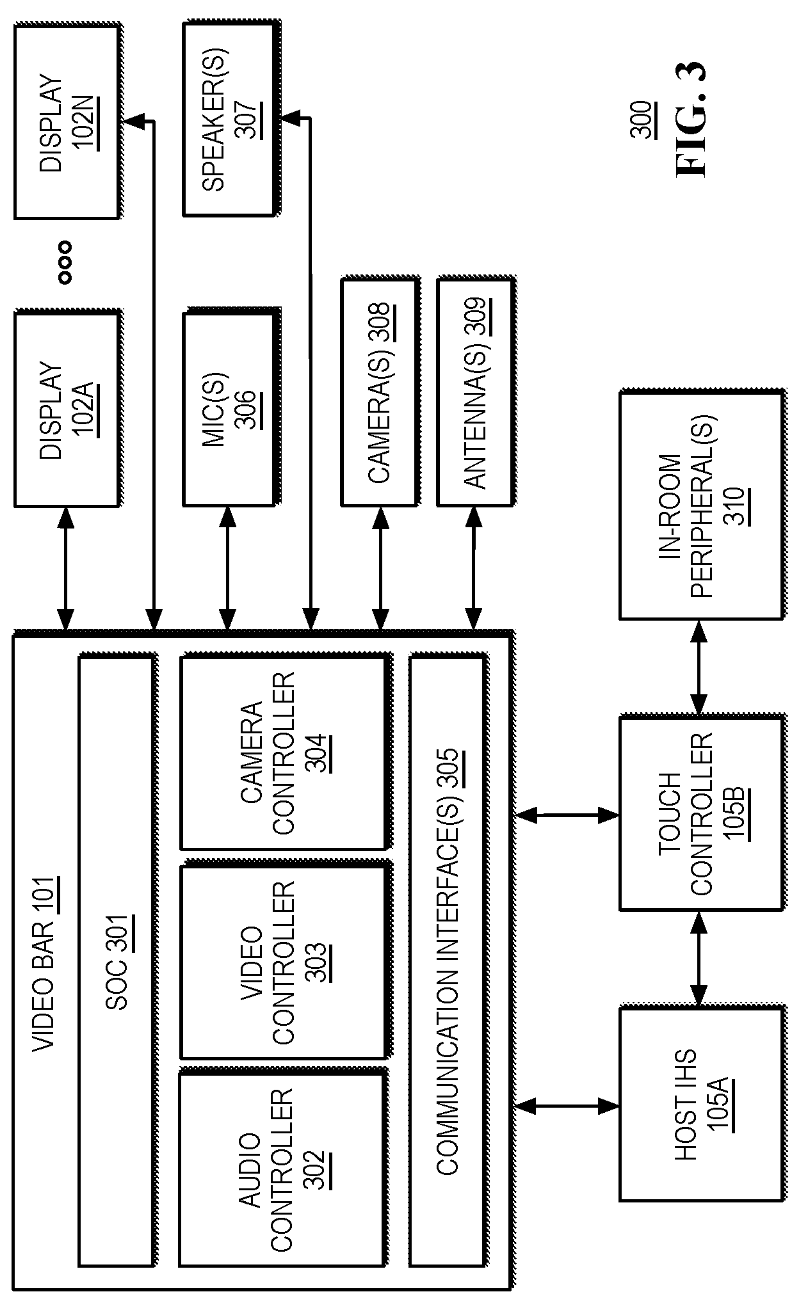
FIG. 3 is a diagram illustrating examples of components of a video bar, according to some embodiments.

Battery Management Unit (BMU) 212 may be coupled to EC 209 and it may include, for example, an Analog Front End (AFE), storage (e.g., non-volatile memory), and a microcontroller. In some cases, BMU 212 may be configured to collect and store information, and to provide that information to other IHS components, such as for example, devices within heterogeneous computing platform 300 (FIG. 3).

Examples of information collectible by BMU 212 may include, but are not limited to: operating conditions (e.g., battery operating conditions including battery state information such as battery current amplitude and/or current direction, battery voltage, battery charge cycles, battery state of charge, battery state of health, battery temperature, battery usage data such as charging and discharging data; and/or IHS operating conditions such as processor operating speed data, system power management and cooling system settings, state of "system present" pin signal), environmental or contextual information (e.g., such as ambient temperature, relative humidity, system geolocation measured by GPS or triangulation, time and date, etc.), events, etc.

Examples of events may include, but are not limited to: acceleration or shock events, system transportation events, exposure to elevated temperature for extended time periods, high discharge current rate, combinations of battery voltage, battery current and/or battery temperature (e.g., elevated temperature event at full charge and/or high voltage causes more battery degradation than lower voltage), etc.

In some embodiments, IHS 200 may not include all the components shown in FIG. 2. In other embodiments, IHS 200 may include other components in addition to those that are shown in FIG. 2. Furthermore, some components that are represented as separate components in FIG. 2 may instead be integrated with other components, such that all or a portion of the operations executed by the illustrated components may instead be executed by the integrated component.

For example, in various embodiments described herein, host processor(s) 201 and/or other components shown in FIG. 2 (e.g., chipset 202, display controller(s) 204, communication interface(s) 205, EC 209, etc.) may be replaced by devices within heterogenous computing platform 300 (FIG. 3). As such, IHS 200 may assume different form factors including, but not limited to: servers, workstations, desktops, laptops, appliances, video game consoles, tablets, smartphones, video bars, etc.

FIG. 3 is a diagram illustrating examples of components 300 of video bar 101. As shown, video bar 101 includes SoC 301, such as a heterogeneous computing platform, or the like. Video bar 101 may also include audio controller 302, video controller 303, camera controller 304, and communication interface(s) 305.

In some implementations, one or more of components 302-305 may be integrated directly into SoC 301. Such integrated components or "IP cores" may be coupled to one more processing cores of SoC 301 via an interconnect fabric, or the like. In other cases, one or more of components 302-305 may be external to SoC 301, and may be coupled to the one more processing cores via a bus, or the like.

Communication interface(s) 305 may enable communications between video bar 101 and various wired and/or wireless networks, such as Ethernet, WiFi, BT/BLE, cellular or mobile networks, satellite networks, or the like. Communication interface(s) 305 may also enable communications between video bar 101 and shared or external display(s) 102 (e.g., via a Video Graphics Array or "VGA" interface, a High-Definition Multimedia Interface or "HDMI" interface, etc.). In addition, communication interface(s) 305 may enable communications with USB devices or the like. As such, communication interface(s) 305 may be used to enable various types of communications between video bar 101 and wired/wired networks, the Internet, other IHSs, BT speakers, microphones, headsets, external displays, touch controllers, whiteboards, hard drives, peripherals, etc.

Video bar 101 is coupled to shared or external display(s) 102A-N, microphone(s) 306, speaker(s) 307 and camera(s) 308. Video bar 101 may also include wireless antenna(s) 309, which may be coupled to communication interface(s) 305.

In various embodiments, video bar 101 may be equipped with multi-point positioning technology that enables it to determine the presence, location, and/or orientation of IHSs 104A-N (or of an integrated display of IHSs 104A-N) within room 100. For example, high-accuracy distance measurements may be performed using phase-based ranging protocols, or the like.

Video bar 101 is further coupled to host IHS 105A and in-room touch controller 105B (e.g., touchscreen controller(s) 204). In some implementations, host IHS 105A and/or touch controller 105B may facilitate the operation of video bar 101, or aspects thereof, in meeting room 100, and may be coupled to in-room peripherals 310 (e.g., shared displays, whiteboards, microphones, speakers, lighting systems, HVAC controller or thermostat, etc.).

In some implementations, components 105A and/or 105B may be absent, such as when SoC 301 is equipped with resources sufficient to perform advanced operations such as, for example, compute-intensive Artificial Intelligence (AI) or Machine Learning (ML) operations (e.g., gesture or facial recognition, etc.), encryption and decryption algorithms, etc., without the need for additional computing power. In such cases, SoC 301 may include a high-performance AI device such as a Neural Processing Unit (NPU), a Tensor Processing Unit (TSU), a Neural Network Processor (NNP), or an Intelligence Processing Unit (IPU), and it may be designed specifically for AI/ML, which speeds up the processing of AI/ML tasks.

In various embodiments, SoC 301 may be configured to execute one or more AI/ML model(s). Such AI/ML model(s) may implement: a neural network (e.g., artificial neural network, deep neural network, convolutional neural network, recurrent neural network, autoencoders, reinforcement learning, etc.), fuzzy logic, deep learning, deep structured learning hierarchical learning, Support Vector Machine (SVM) (e.g., linear SVM, nonlinear SVM, SVM regression, etc.), decision tree learning (e.g., classification and regression tree or "CART"), Very Fast Decision Tree (VFDT), ensemble methods (e.g., ensemble learning, Random Forests, Bagging and Pasting, Patches and Subspaces, Boosting, Stacking, etc.), dimensionality reduction (e.g., Projection, Manifold Learning, Principal Components Analysis, etc.), or the like.

Non-limiting examples of available AI/ML algorithms, models, software, and libraries that may be utilized within embodiments of systems and methods described herein include, but are not limited to: PYTHON, OPENCV, INCEPTION, THEANO, TORCH, PYTORCH, PYLEARN2, NUMPY, BLOCKS, TENSORFLOW, MXNET, CAFFE, LASAGNE, KERAS, CHAINER, MATLAB Deep Learning, CNTK, MatConvNet (a MATLAB toolbox implementing convolutional neural networks for computer vision applications), DeepLearnToolbox (a Matlab toolbox for Deep Learning from Rasmus Berg Palm), BigDL, Cuda-Convnet (a fast C++/CUDA implementation of convolutional or feed-forward neural networks), Deep Belief Networks, RNNLM, RNNLIB-RNNLIB, matrbm, deeplearning4j, Eblearn.lsh, deepmat, MShadow, Matplotlib, SciPy, CXXNET, Nengo-Nengo, Eblearn, cudamat, Gnumpy, 3-way factored RBM and mcRBM, mPoT, ConvNet, ELEKTRONN, OpenNN, NEURALDESIGNER, Theano Generalized Hebbian Learning, Apache SINGA, Lightnet, and SimpleDNN.

Figure 4A:
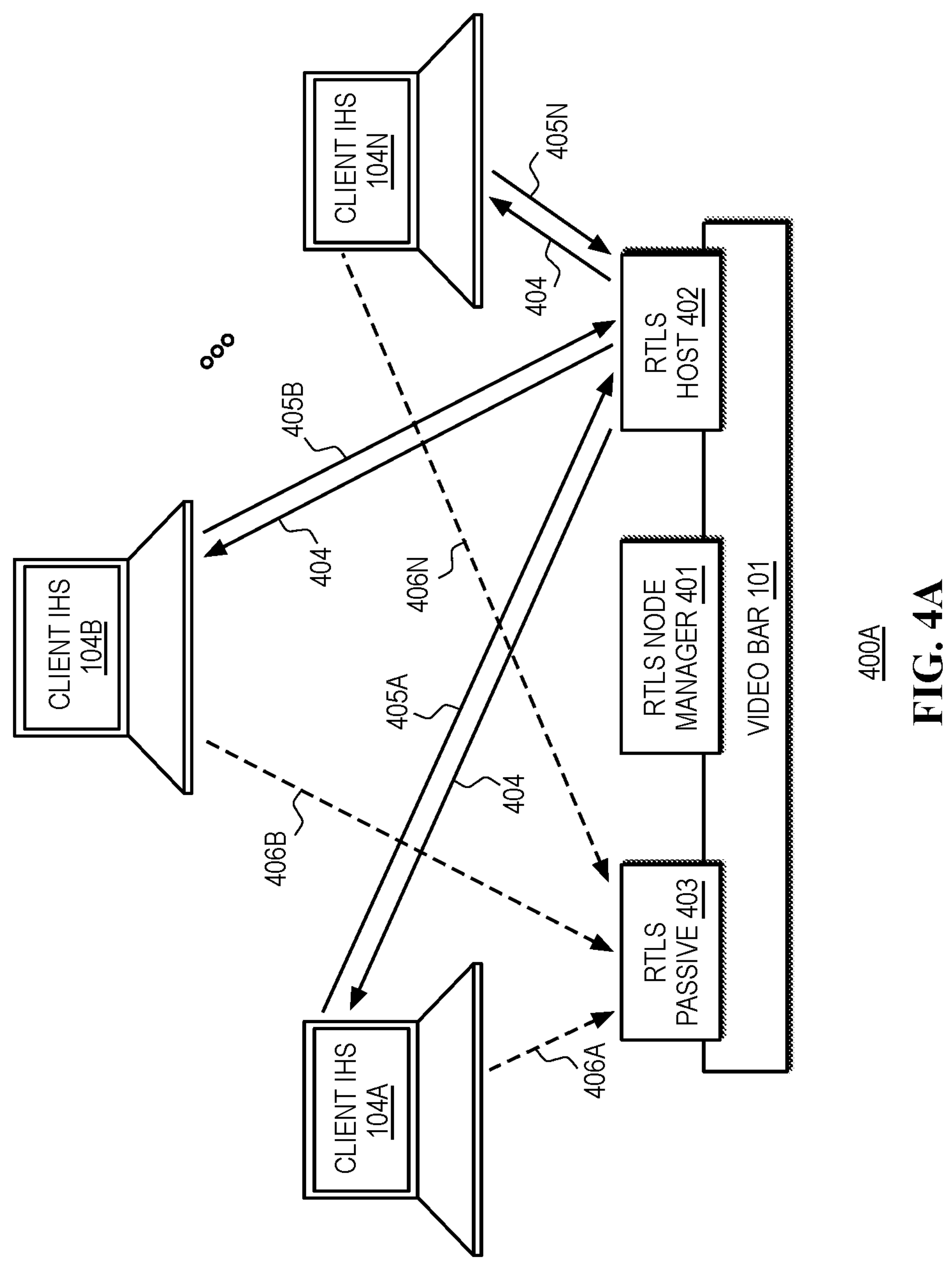
FIGS. 4A-C are diagrams illustrating examples of multipoint positioning systems and techniques, according to some embodiments.
Figure 4C:
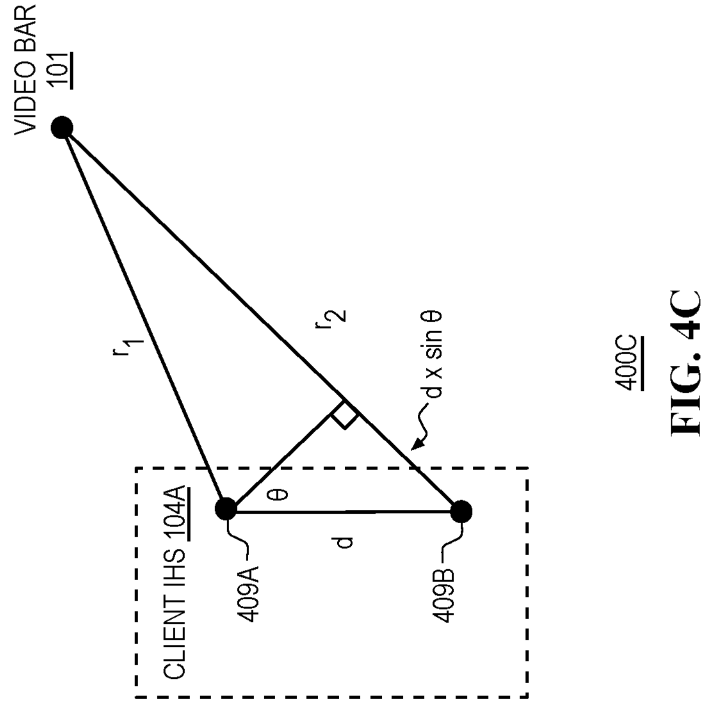
Figure 4B:
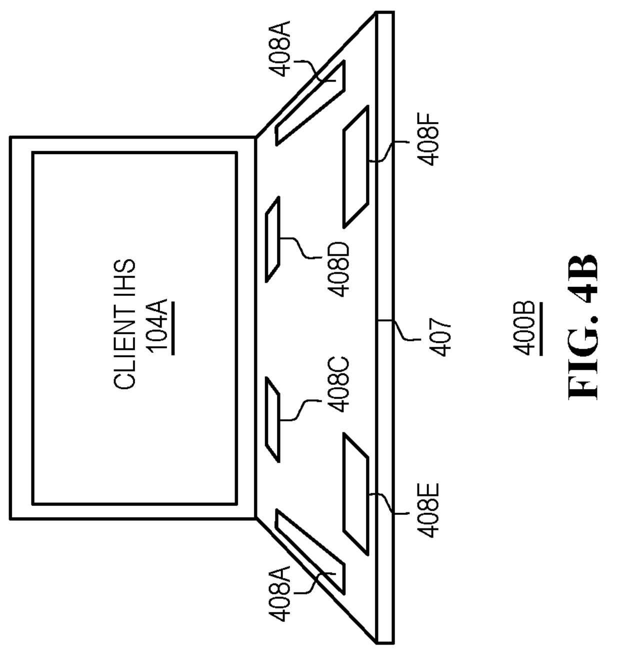

FIGS. 4A-C are diagrams illustrating examples of multi-point positioning systems 400A/B and techniques 400C, according to some embodiments. Particularly, in FIG. 4A, multi-point positioning system 400A includes a number of IHSs 104A-N within range of video bar 101 in room 100. Video bar 101 is shown as implementing, executing, or instantiating Real-Time Locating System (RTLS) node manager 401, which is coupled to RTLS passive antenna 403 (e.g., one of antennas 309) and RTLS host or active antenna 402.

In operation, RTLS host or active antenna 402 may be used by RTLS node manager 401 to transmit electromagnetic signal(s) or beacon(s) 404, for example, and to receive acknowledgment (ACK) message(s) 405A-N from client IHSs 104A-N in response thereto. RTLS passive antenna 403 may be used to listen to "ping" and/or acknowledgment (ACK) messages 406A-N in parallel with RTLS host or active antenna 402. As a result, RTLS node manager 401 may receive distance information from RTLS antennas 402 and 403 for an improved survey of devices disposed within room 100.

In operation, RTLS host or active antenna 402 may initiate a Time-of-Flight (ToF) sequence by broadcasting ToF_PING signal 404. Client IHS 104A may listen to RTLS host or active antenna 402 for ToF_PING signal 404 and, upon receipt, it may transmit a ToF ACK 405A (e.g., after a selected or deterministic amount of time delay). Each of client IHSs 104A-N may transmit its own ToF ACK 405A-N signals back to RTLS host or active antenna 402. Additionally, or alternatively, each ToF_PING signal 404 may be stamped with a time of transmittal, which is then compared with a time the signal is received by client IHS 104A, and from which a ToF may be calculated. In that case, the ToF ACK signal 405A from client IHS 104A may include an indication of the ToF.

In some implementations, a Received Signal Strength Indicator (RSSI) level of each received signal may also be used to help calculate a location and/or orientation of various devices. Furthermore, RTLS passive antenna 403 may listen for ToF_PING and ToF_ACK signals usable to calculate additional ToF values that may be used to increase spatial diversity.

In some cases (e.g., large rooms, multipath scenarios, etc.), phase-based RTLS BT systems may operate using multiple frequencies, for example, as outlined in the BT 4.0 (BLE) Specifications.

In other cases (e.g., small rooms), measurements using a single frequency may suffice. A flag usable as a constant tone may be sent using a connectionless (e.g., a beacon) or connected (e.g., through a data channel) protocol data unit (PDU), along with constant tone. This allows for device positioning without the need to pair client IHS 104A to video bar 101. Generally speaking, a positioning accuracy of 5 cm with a total measurement time of approximately 25 ms may be achieved.

To that end, FIG. 4B shows antenna system 400B disposed within client IHS 104A and/or integrated into IHS chassis 407. Although shown as IHS 104A as an example, in other cases, devices equipped with antenna system 400B may include peripherals or other in-room devices to be located. Specifically, antenna system 400B may include a plurality of antennas 408A-F, such as, for example: a first WiFi antenna, a second WiFi antenna, a 5G main antenna, a first 5G MIMO antenna, a second 5G MIMO antenna, a 5G auxiliary antenna, etc.

Although antenna system 400B shows antennas 408A-F disposed on a keyboard, wrist rest area, or trackpad surface of IHS 100, in other embodiments one or more of antennas 408A-F may be disposed elsewhere on the IHS's chassis, including its lateral or bottom surfaces, behind an integrated display, around its bezel, etc.

Generally speaking, any of antennas in system 400B may be used as RTLS antennas 402 and/or 403 for RTLS purposes. This feature is particularly useful, for instance, when IHS 104A is in a closed-lid configuration. Moreover, when IHS 104A has a form factor such that it may assume a number of different postures (e.g., laptop, book, tablet, etc.) and some of these postures may block reception or transmission by one or more antennas, other antennas may be selected or switched in for RTLS purposes (e.g., by EC 209). In some cases, multiple antennas 408A-F may be used simultaneously, concurrently, or sequentially to determine the orientation (e.g., angle θ) of client IHS 104A in room 100 and/or on table 103.

In FIG. 4C, for example, IHS 104A includes antennas 409A and 409B (any of antennas 408A-F) separated by a fixed distance "d." Reference plane 407 for direction may be determined from the location of antennas 409A/B. In some cases, any orthogonal plane may be configured as reference plane 407 for IHS 104A. This information may be stored along with antenna configuration information in IHS 104A.

Video bar 101 is shown (e.g., RTLS host antenna 402). Once distances $r_1$ and $r_2$ are determined (e.g., using ToF calculations) and assuming d is known, angle θ may be computed using:

$$\theta = \sin^{-1}\left(\frac{r_2 - r_1}{d}\right).$$

The calculated location and orientation information may be sent to video bar 101 and/or to client IHS 104A, for example, with BT messaging using a custom Generic Attribute Profile (GATT).

Figure 5:
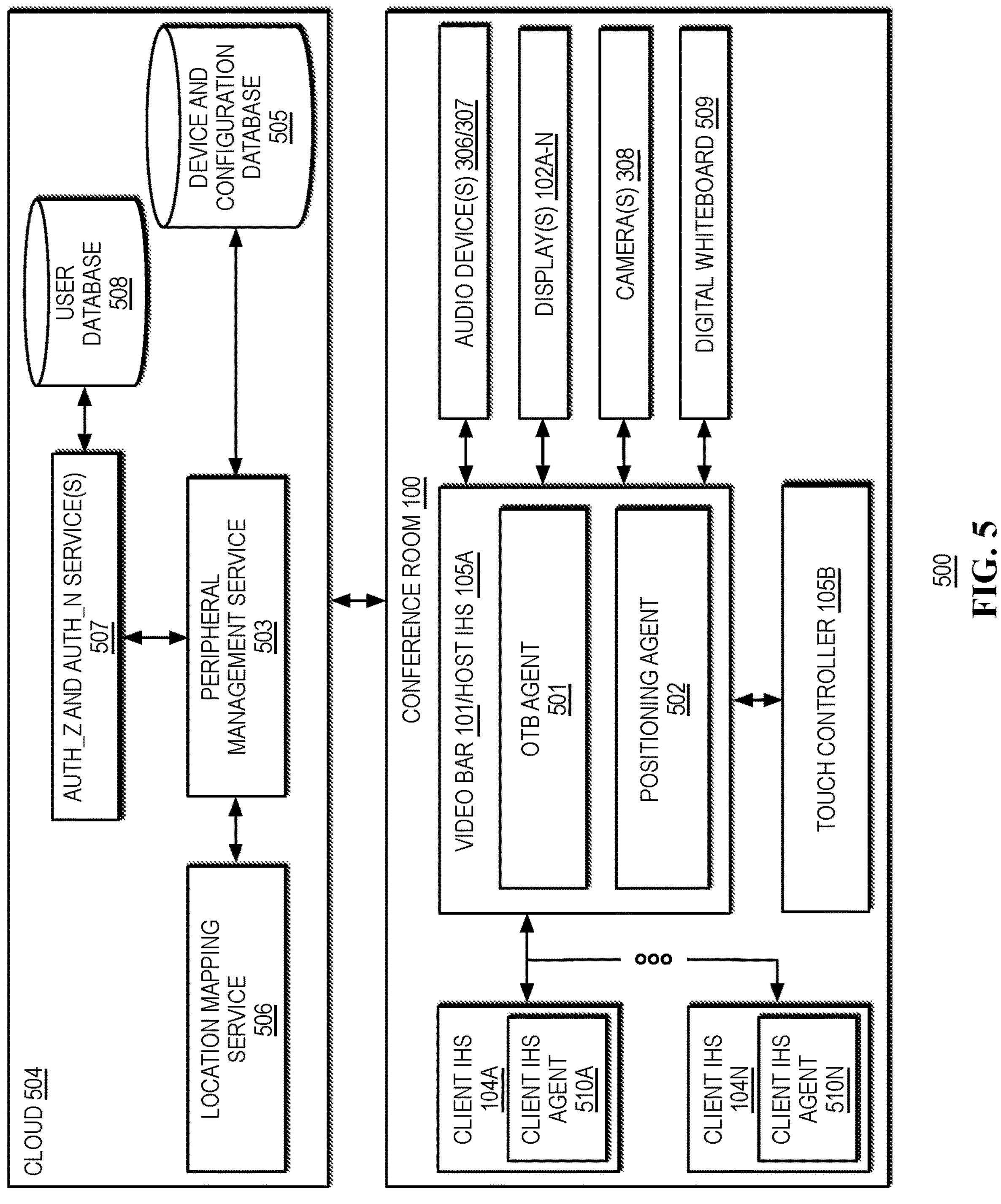
FIG. 5 is a diagram illustrating an example of an architecture usable for determining a device's location, position, and/or orientation, according to some embodiments.

FIG. 5 is a diagram illustrating an example of architecture 500 usable for determining a device's location, position, and/or orientation (e.g., IHSs 104A-N). As shown, architecture 500 includes certain components that are disposed in conference room 100 and others that reside in cloud 504 (e.g., servers or other IHSs that may be accessed over the Internet, and/or the software and databases that run on those servers).

In this example, conference room 100 includes client IHSs 104A-N in communication with video bar 101 and/or host IHS 105A. Each of IHSs 104A-N may be configured to implement, execute, or instantiate a respective client IHS agent 510A-N. Video bar 101 and/or host IHS 105A may also include, or otherwise be coupled to, display(s) 102A-N, audio device(s) 306/207, camera(s) 308, digital whiteboard 509, and touch display or controller 105B. In other examples, however, other devices may be present in room 100 and one or more of the devices shown may be absent.

Video bar 101 and/or host IHS 105A are configured to implement, execute, or instantiate OTB agent 501 and positioning agent 502. Positioning agent 502 may be configured to determine a distance, location, position, and/or orientation of a device (e.g., one of IHSs 104A-N, digital whiteboard 509, displays 102A-N, camera(s) 308, audio devices 306/307, touch controller 105B, etc.) in room 100, and OTB agent 501 may be configured to communicate the device's distance, location, position, and/or orientation information to peripheral management service 503 on cloud 504.

For example, positioning agent 502 may be configured to run the positioning algorithms described previously to locate each BT-capable peripheral (e.g., microphones, laser pointers, etc.) in conference room 100. The distance, location, and/or orientation of peripherals with respect to video bar 101 and/or host IHS 105A is then sent to cloud 504 for processing. Positioning agent 502 may later also query location mapping service 506 on cloud 504 for the location/position of a particular resource or peripheral in room 100 that it may need in order to allow or block selected features.

Examples of hardware-based features that may be allowed, blocked, or modified on a by-device, by-user, by-room, and/or by-meeting basis depending at least in part upon the distance, location, position, and/or orientation of client IHS 104A (or any/all other client IHSs 104B-N in room 100) include, but are not limited to: access to or control of devices integrated into client IHS 104A (e.g., client IHS 104A's integrated camera, display, microphone, speakers etc.), access to or control of devices integrated into other client IHSs 104B-N (e.g., other client IHSs 104B-N's integrated cameras, displays, microphones, speakers etc.), and/or access to or control of devices available in room 100 (e.g., video bar, host IHS, touchscreen controller, external or shared displays or projectors, external or shared cameras, digital whiteboards, laser pointers, room lighting system, room thermostat, etc.).

Meanwhile, examples of software-based features that may be allowed, blocked, or modified on a by-device, by-user, by-room, and/or by-meeting basis depending at least in part upon the distance, position, and/or orientation of client IHS 104A (or any/all other client IHSs 104B-N in room 100) include, but are not limited to: starting a remote meeting, admitting or removing a participant, muting or unmuting a microphone or speaker, changing an audio input or output gain or volume, activating or deactivating a video effect (e.g., display blur, virtual background, etc.), sharing content (e.g., file, desktop, or window sharing), recording audio and/or video, changing a status of a participant of the collaboration session, viewing or producing closed caption or live transcripts, etc.

In some cases, the aforementioned hardware and software-based features may be set based upon one or more polic (ies) associated with a particular room and/or with a specific remote meeting. Such a policy (e.g., expressed as a JavaScript Object Notation or "JSON" file, an extensible Markup Language or "XML" file, etc.) may be enforceable, at least in part, by OTB agent 501 executed by video bar 101 and/or host IHS 105A.

Generally speaking, polic (ies) may include rules for operating, configuring, selecting settings, etc. with respect to video bar 101, host IHS 105A, touch controller 105B, client IHS 104A, a user of client IHS 104A, client IHSs 104A-N (e.g., number or distribution of client IHSs in a conference room), and users of the plurality of client IHSs 104A-N, etc. In addition, polic (ies) may include rules for operating, configuring, selecting settings, etc. with respect to any peripheral device in conference room 100, such as display(s) 102A-N, microphone(s) 306, speaker(s) 307, camera(s) 308, digital whiteboard 509, etc.

Policy rules may output commands, notifications, and settings to be performed during, in anticipation of, and/or upon termination of a remote session, for example, depending upon a number of client IHSs in room 100, a particular client IHS's location or orientation, and/or a particular client IHS's location or orientation relative to: video bar 101, a wall, door, stage, or window of room 100, other client IHS(s), an in-room display, an in-room camera, a digital whiteboard, etc., or any other suitable contextual information.

In some cases, one of a plurality of external cameras may be selected during a remote meeting depending upon the orientation(s) of one or more client IHSs (e.g., an average of all participants' orientations, an average of all participants' orientations where each orientation weighed proportionally by its respective participant's role in the remote meeting, etc.) in room 100. In other cases, one of a plurality of external displays may be similarly selected depending upon the orientation(s) of one or more client IHSs in room 100. In yet other cases, one of a plurality of audio devices (e.g., microphones) may be similarly selected depending upon the orientation(s) of one or more client IHSs in room 100.

In other cases, a policy enforceable at least in part by video bar 100 may provide that, if there is only one client IHS in room 100, a remote meeting session should use the client IHS's integrated camera, whereas if multiple client IHSs are detected, an external camera may be employed in addition or as an alternative thereto. In cases were SoC 301 and/or host IHS 105A are equipped with gesture recognition features, a first camera may be selected to capture a first participant's video for broadcasting it during a remote meeting and a second camera may be selected to capture the first (or a second) participant's video for gesture recognition purposes, for example, based upon the location and/or orientation of one of client IHSs 104A-N used by a host or speaker of a remote meeting.

OTB agent 501 may be responsible for communications between positioning agent 502 and cloud 504. Once it receives coordinates, distances, angles, etc. from positioning agent 502, OTB agent 501 sends that information to peripheral management service 503 in cloud 504.

On cloud 504, peripheral management service 503 is coupled to device and configuration database 505 and location mapping service 506. Particularly, peripheral management service 503 may operate as an orchestrator in cloud 504 that connects cloud services with video bar 101 and/or host IHS 105A.

Location mapping service 506 is a core service in cloud 504 and it gathers all the individual locations of IHSs, peripherals, and other resources in conference room 100 from positioning agent 502 and generates a virtual map of room 100 with each IHS/peripheral/device identifier tagged with a coordinate in room 100. In this manner, location mapping service 506 may maintain the location of all IHSs/peripherals/devices in across all conference rooms where the architecture is deployed. Location mapping service 506 may also publish Application Programming Interfaces (APIs) that OTB agent 501 may query to determine the location of any IHS/peripheral/device having a selected identifier.

Peripheral management service 503 is further coupled to authorization (AuthZ) and authentication (AuthN) service(s) 507. AuthZ and AuthN service(s) 507 are coupled to user database 508.

In some cases, device and configuration database 505 may include, for each IHS recorded therein, information such as, for example: serial numbers, model numbers, service tags, device capabilities, settings, configurations, firmware versions, health status, utilization data, digital certificates, public encryption keys, device telemetry data, etc. Moreover, user database 508 may include personal or unique IHS user information, such as name, identification number, current job or position, employment history, associated or enterprise-issued client IHSs (e.g., by serial number or service tags) and peripheral devices, geographic location or address, import/export or other legal restrictions, etc.

Figure 6:
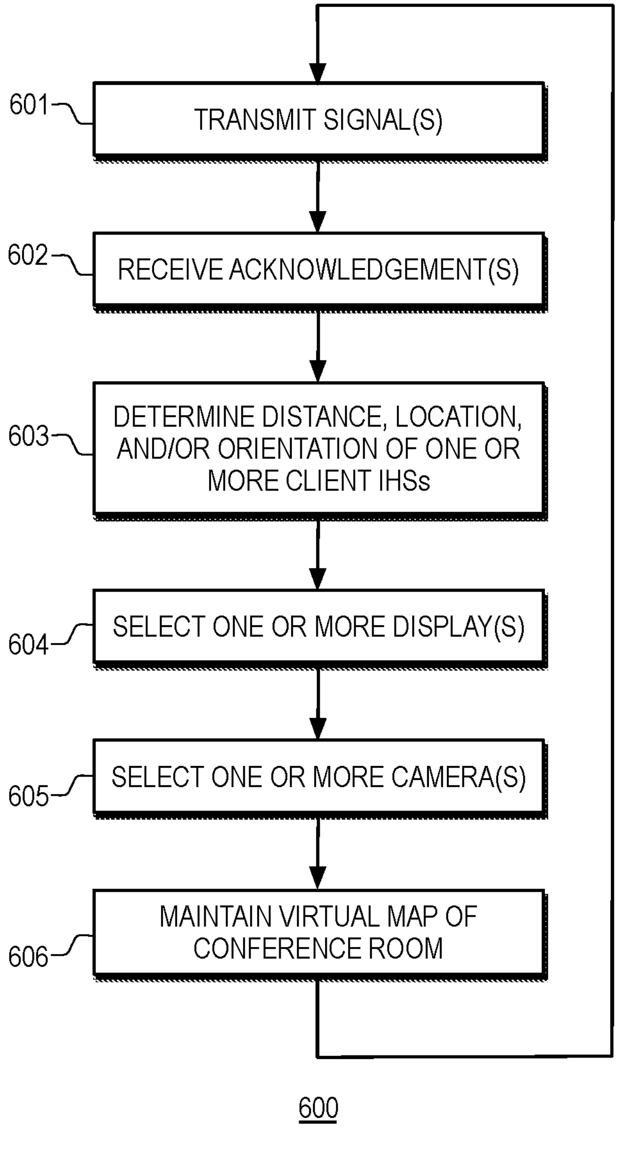
FIG. 6 is a diagram illustrating an example of a method for determining a device's location, position, and/or orientation, according to some embodiments.

In execution, OTB agent 501, positioning agent 502, peripheral management service 503, device and configuration database 505, location mapping service 506, AuthZ and AuthN service(s) 507, and user database 508 may be employed to perform one or more operations described with respect to FIG. 6.

FIG. 6 is a diagram illustrating an example of method 600 for determining a device's location, position, and/or orientation. In various embodiments, method 600 may be performed, at least in part, by components of architecture 500 of FIG. 5.

Method 600 begins at 601, where video bar 101 transmits signals (e.g., BT beacons) in meeting room 100. At 602, video bar 101 receives ACK messages from one or more devices, such as client IHSs 104A-N or other peripheral devices in meeting room 100 (e.g., display(s) 102).

At 603, video bar 101 (and/or host IHS 105A) may determine the distance, location, and/or orientation of one or more of IHSs 104A-N or other devices in meeting room 100, for example, using the aforementioned ToF techniques.

At 604, in response to a determination of where IHSs 104A-N and other devices are disposed in meeting room 100, as well as their orientation, video bar 101 may select one or more display(s) 102A-N to be used during a remote meeting, for example, based upon a policy. Additionally, or alternatively, at 605, still in response to the determination, video bar 101 may also select one or more camera(s) 308 to be used during the remote meeting based on the policy.

For example, in response to a situation where there is a single user in meeting room 100 and the user's IHS 104A has its lid closed, video bar 101 may enforce a policy that turns on external display 102 and uses camera 308 (as opposed to the IHS's integrated display and camera, if any). If there is more than one display in meeting room 100, a display that is facing IHSs 104A-N may be selected in favor of another display or camera that is behind IHSs 104A-N, for example. If users turn around or move during the meeting, video bar 101 may enforce a policy that selects another display or camera to be used. If a user changes the posture of IHS 104A such that the IHS's integrated camera's field-of-view (FOV) is blocked (e.g., closed against a lid or keyboard), video bar 101 may also select another camera to be used.

In some cases, microphone(s) 306 and/or speaker(s) 307 may be distributed across room 100, and may also be selected during a remote meeting in response to changes in an IHS or peripheral device's distance, location, or orientation with respect to video bar 101.

At 606, video bar 101 and/or host IHS 105A may create and maintain a virtual map of conference room 100. For example, video bar 101 may maintain a table containing the room's dimensions, as well as the location coordinates of any door, window, and/or furniture (e.g., table, sofa, etc.) located in meeting room 100. The table may also contain the identification, location coordinates, and orientation of IHSs and peripheral devices present in room 100. The table may also contain the identification, location coordinates, and orientation of cameras, displays, speakers, and microphones in room 100.

In some embodiments, the information contained in such a table may be rendered on a Graphical User Interface (GUI) in the form of a digital or virtual map of room 100. In some cases, the virtual map may also be overlaid upon or otherwise combined with a live or snapshot image of room 100.

Particularly, once an image of room 100 is obtained, SoC 301 and/or camera controller 304 may perform ML/AI feature extraction operations that identify, in one or more images of shared space 301 captured by camera(s) 103, elements such as: objects, surfaces, and shapes (e.g., doors, windows, tables, furniture, etc.), landmarks, client IHSs, human beings (including body parts such as: head, face, eyes, ears, mouth, arm, hand, fingers, fingertips, etc.), displays, microphones, speakers, digital whiteboards, cameras, etc.

Examples of feature extraction techniques and algorithms usable by SoC 301 and/or camera controller 304 to identify these elements may include, but are not limited to: edge detection, corner detection, blob detection, ridge detection, scale-invariant feature transforms, thresholding, template matching, Hough transforms, etc.

As such, the distance, location, position, and/or orientation of any entity in room 100, including client IHSs 104A-N and any detected peripheral devices using multipoint positioning system 400A may be reconciled against a respective distance, location, position, and/or orientation of the device as determined using images from camera(s) 308.

When facial recognition is enabled, video bar 101 and/or host IHS 105A may perform facial recognition upon participants in room 100 and match users to their respective client IHSs 104A-N, for example, for security or productivity purposes.

After 606, control returns to 601. In this manner, video bar 101 may continuously and/or periodically evaluate the IHSs and devices present in room 100, as well as their distances, locations, and/or orientations, and it may use that information to select which devices to use during a remote meeting, as well as perform other actions, as described in more detail below.

As such, systems and methods described herein enable video bar 101 to gather locations of resources in a room, and to generate a virtual mapping system that may be later referred to for execution of location-based features. The use of spatial diversity with RTLS passive antenna 403 improves ranging accuracy and allows for low latency multi-device collaboration room measurements with a pre-defined single frequency tone. Moreover, these systems and methods may be used to determine the orientation of client IHSs with respect to video bar 101 and/or collaboration room 100 with multi-antenna measurements on client IHSs.

It should be noted that, in various embodiments, architecture 500 may be combined with components of other architectures described herein, and method 600 may be combined with operations of other methods described herein, to provide additional or alternative features.

As described herein, in an illustrative, non-limiting embodiment, a video bar may include a processor and a memory coupled to the processor, the memory having program instructions stored thereon that, upon execution by the processor, cause the video bar to: transmit a signal in a conference room; in response to the transmission, receive an acknowledgment from a client IHS in the conference room; and determine a distance between the video bar and the client IHS based, at least in part, upon a ToF calculation, where the ToF calculation is based, at least in part, upon a difference between: (i) a time the acknowledgment is received, and (ii) a time of the transmission.

The processor may include or be coupled to a video camera controller configured to capture an image of at least a portion of the conference room. Additionally, or alternatively, the processor may include or be coupled to a display controller configured to render an image on a shared display during a conference session. The signal may be broadcast as a BT signal.

The video bar may include an active RTLS and a passive RTLS in communication with a node manager executed by the processor. The program instructions, upon execution by the processor, cause the video bar to transmit the signal using the active RTLS and to receive the acknowledgment via the active RTLS and the passive RTLS. In some cases, the distance may be determined using a phase-based ranging technique.

The program instructions, upon execution by the processor, further cause the video bar to determine a location of the client IHS in the conference room. The program instructions, upon execution by the processor, may also cause the video bar to determine the orientation of the client IHS in the conference room.

The orientation may include or indicate an orientation of a display integrated into the client IHS. In some cases, the orientation may be determined with respect to a shared display disposed in the conference room. In other cases, the orientation may be determined with respect to a camera disposed in the conference room.

The program instructions, upon execution by the processor, cause the video bar to select one or more of a plurality of cameras disposed in the conference room to capture an image based, at least in part, upon the orientation. For example, the plurality of cameras may include: (i) a camera integrated into the client IHS, (ii) another camera integrated into or coupled to the video bar, and (iii) yet another camera integrated into another client IHS.

The program instructions, upon execution by the processor, may also cause the video bar to select one or more of a plurality of displays disposed in the conference room to render an image based, at least in part, upon the orientation. For example, the plurality of displays may include: (i) a display integrated into the client IHS, (ii) another display coupled to the video bar, or (iii) yet another display integrated into another client IHS.

In some implementations, the processor may be coupled to a host IHS external to the video bar, and the host IHS may be configured to make at least a portion of the ToF calculation or the determination. The program instructions, upon execution by the processor, may further cause the video bar or the host IHS to create or maintain a virtual map of one or more client IHSs disposed in the conference room.

In another illustrative, non-limiting embodiment, a memory device may have program instructions stored thereon that, upon execution by a processor of a host IHS coupled to a video bar in a conference room, cause the host IHS to: determine distances between the video bar and a plurality of client IHSs based, at least in part, upon ToF calculations; and create or maintain a virtual map of one or more of the plurality of client IHSs disposed in the conference room during a conference session based, at least in part, upon the distances.)

In yet another illustrative, non-limiting embodiment, a method may include determining an orientation of each of a plurality of client IHSs disposed in the conference room, at least in part, using a video bar; and based at least in part upon the orientations, selecting at least one of: (i) one or more of a plurality of displays disposed in the conference room to render an image during a conference session, or (ii) one or more of a plurality of cameras disposed in the conference room to capture another image to be transmitted to a remote participant of the conference session.

In various embodiments, systems and methods described herein may be used for handling conference room boundaries and/or context. In a wired conference room environment, users within a meeting room boundary are automatically allowed to connect and control meeting room devices on the basis of their physical presence in the room. For example, a user may control conference room devices (e.g., video bar 101, display 102, etc.) using physical buttons or by connecting cable 106 to IHS 104A running configuration software.

As more IHSs are deployed with wireless features, the inventors hereof have identified a need to detect meeting room boundaries and/or to prevent users from accidentally trying to connect to devices in an adjacent meeting room.

Generally, if a user tries to discover and connect a wireless display or Bluetooth device of a meeting room, several issues may be observed, such as: (1) multiple devices in nearby meeting rooms are be discovered wirelessly and the user needs to rely on some naming convention to know which device to connect, and (2) when connecting for the first time, user might be prompted to key in access code displayed in the room (this is partly to prevent accidental connection to a wrong nearby device), which is a cumbersome process.

Using systems and methods described herein, however, when user walks into meeting room 100, their IHS accurately and wirelessly identifies the meeting room context, without the need for additional mechanisms to prevent mistaken identification of other meeting rooms nearby. Once the meeting room context is identified, software on an IHS may present relevant options for its user, such as, for example: wireless control of conference room devices, automatically preventing audio feedback, collaborating with other users in the same meeting virtually, etc. Moreover, when the user walks out of meeting room 100, the meeting room context may be automatically discarded or invalidated, along with any invalidated previously available to them.

In some embodiments, to assemble meeting room context information, video bar 101 and/or host IHS 100 may combine: (i) the physical boundaries of meeting room 100, determined using ultrasonic frequencies or other proximity-based technologies, with (ii) meeting information associated with an ongoing or upcoming remote meeting identification. For example, meeting room context may include room data (e.g., room name or ID, device list, virtual map, etc.), wireless credentials (e.g., tokens, keys, certificates, etc.) and meeting data (e.g., meeting ID, meeting app, duration, invited participants, present participants, role(s) of IHS user(s), etc.).

Ultrasound is an effective way to detect meeting room boundaries due to the property that acoustic waves are more likely to be contained within a meeting room's walls than electromagnetic waves. Conversely, an electromagnetic signal, such as a BT or WiFi signal, may not be contained by the meeting room's walls, therefore it is not always possible to tell if an IHS (that can receive the electromagnetic signal) is located inside or outside a meeting room.

Figure 7:
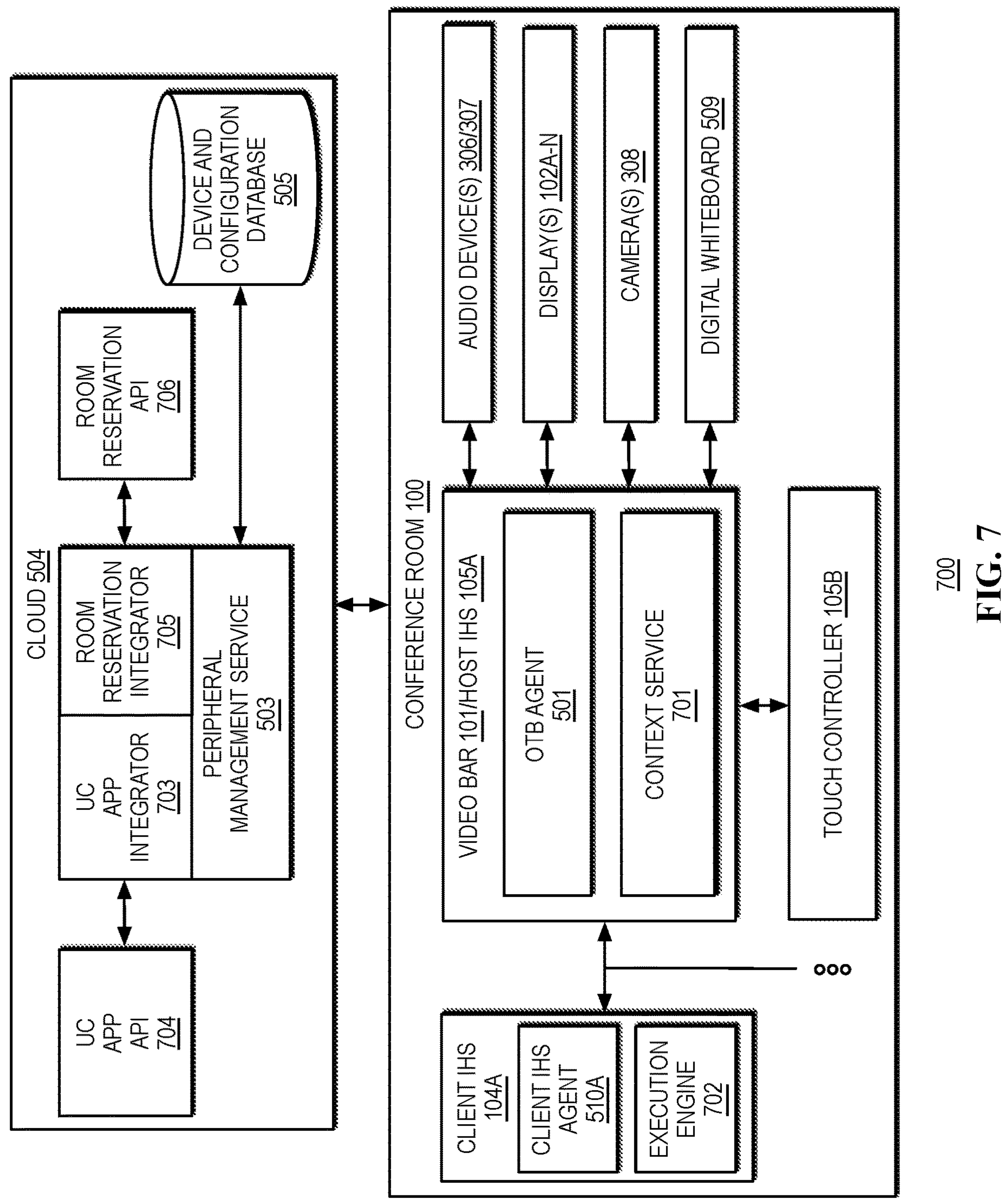
FIG. 7 is a diagram illustrating an example of an architecture usable for handling conference room boundaries and/or context, according to some embodiments.

FIG. 7 is a diagram illustrating an example of architecture 700 usable for handling conference room boundaries and/or context. As shown, architecture 700 includes certain components disposed in conference room 100 and others residing in cloud 504.

In this example, conference room 100 includes client IHSs 104A-N in communication with video bar 101 and/or host IHS 105A (client IHSs B-N are not shown). Each of IHSs 104A-N may be configured to execute a respective client IHS agent 510A-N. Video bar 101 and/or host IHS 105A may also include, or otherwise be coupled to, display(s) 102A-N, audio device(s) 306/207, camera(s) 308, digital whiteboard 509, and touch display or controller 105B. In other examples, however, other devices may be present in room 100 and one or more of the devices shown may be absent.

In room 100, video bar 101 and/or host IHS 105A are configured to implement, execute, or instantiate OTB agent 501 and context service 701. In addition to agent 510A, client IHS 104A is also configured to implement, execute, or instantiate execution engine 702.

On cloud 504, peripheral management service 503 is coupled to device and configuration database 505. Peripheral management service 503 may be configured to use UC API 704 to communicate with a UC service via UC application integrator module 703, and use room reservation API 706 to communicate with a room reservation, calendar, or scheduling service via room reservation integrator module 705.

Context service 701 may be configured to periodically collect and/or broadcast a video bar's ID, a meeting ID, and a temporary meeting session key using an ultrasonic signal or beacon via speaker(s) 307, as orchestrated by OTB agent 501. To that end, context service 701 may communicate with peripheral management service 503 to retrieve, for example, meeting information such as a meeting ID, a meeting application, the duration of a meeting, invited participants, present participants, role(s) of IHS user(s), etc. (e.g., from a UC service via UC API 704), and room reservation information such as: a room name or ID, a device list, a virtual map of the room, wireless credentials (usable to establish subsequent BT or WiFi connections, etc.), and so on (e.g., from a reservation, calendar, or scheduling service via room reservation API 706).

When a user of IHS 104A enters room 100, client IHS agent 510A may receive the ultrasonic signal or beacon, retrieve the meeting ID from the signal, and verify it against US application information, calendar or email invites, etc. Once verified, a meeting room context may be established with room data and meeting data.

After the meeting room context is established, execution engine 702 may perform one or more operations that modify the user's experience based on the context, and/or it may present those options to the user (e.g., via a GUI). Such operations may include, but are not limited to: muting/unmuting meeting room microphones, connecting to an in-room wireless display, automatically joining a collaboration session with participants in the same meeting room, etc.

When the user leaves room 100, IHS 104A stops receiving the ultrasonic broadcast. In response, execution engine 702 may remove or purge the context, such that the options provided by execution engine 702 are no longer available.

As such, in some cases, method 700 may be used to take attendance of participants who are in room 100 during a remote session (e.g., by periodically re-broadcasting the ultrasonic signal, etc.).

In other cases, if video bar 101 and/or host IHS 105A determines that IHS 104A is near (and/or in the direction of) a door or window, video bar 101 may change the amplitude of the ultrasonic signal. For example, by reducing the amplitude of the ultrasonic signal containing the meeting room context, IHS 104A may only receive the signal it if is closer to video bar 101 than other IHSs that are not near (and/or in the direction of) the door or window, in which case IHS 104A is more likely to be within room 100.

Figure 8A:
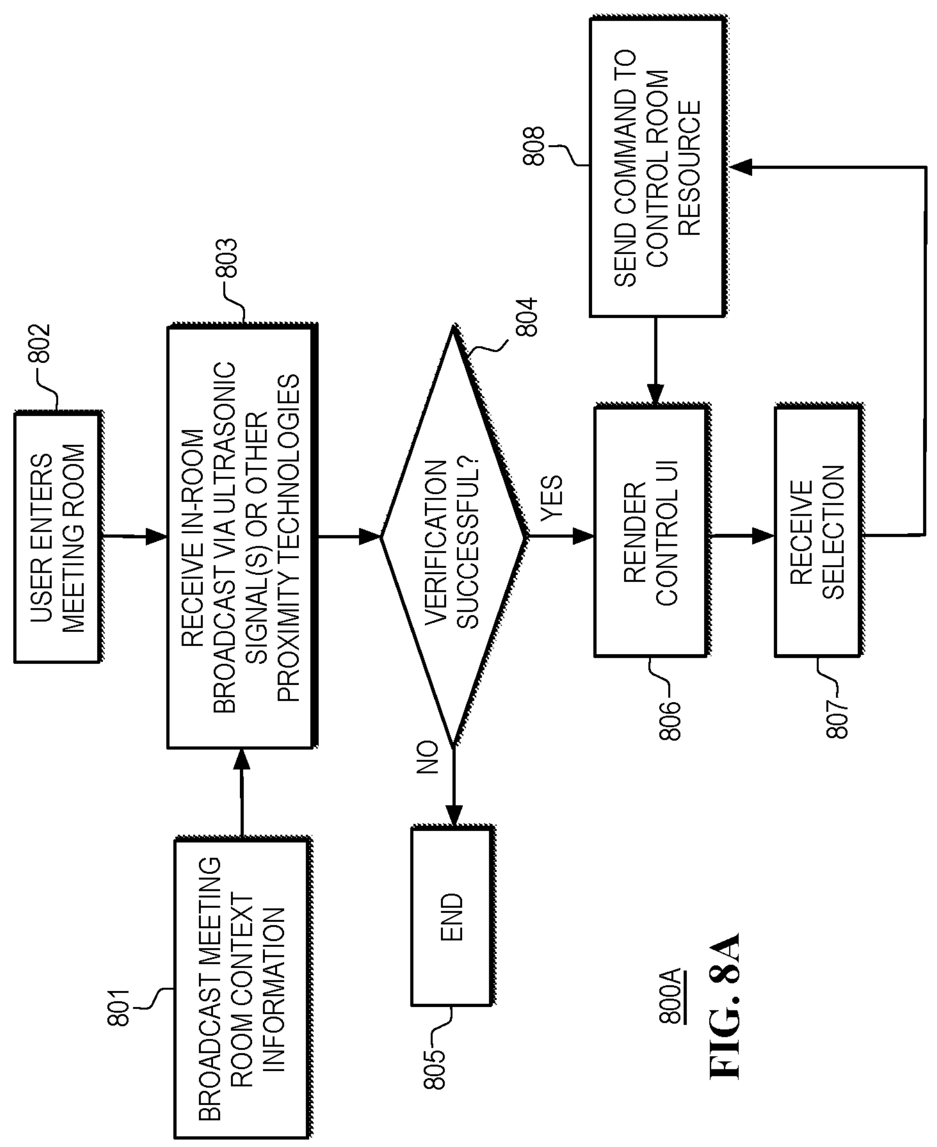
FIGS. 8A and 8B are diagrams illustrating examples of methods for handling conference room boundaries and/or context, according to some embodiments.
Figure 8B:
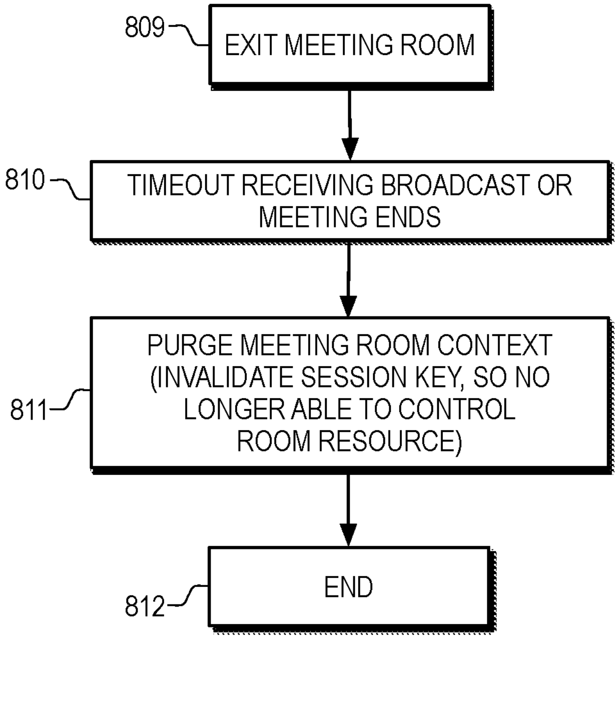

FIGS. 8A and 8B are diagrams illustrating examples of methods 800A and 800B for handling conference room boundaries and/or context. In various embodiments, methods 800A and 800B may be performed, at least in part, by components of architecture 700 of FIG. 7.

Method 800A begins at 801, where video bar 101 transmits ultrasonic signals containing meeting room context information within meeting room 100. These ultrasonic signals may also include a list of parameters that the user may control in room 100, including, but not limited to, microphone mute/unmute, lighting on/off, connect to a wireless display, etc.

In some implementations, ultrasonic signals may be transmitted with an amplitude such that, after undergoing acoustic spreading and absorption, are not detectable by IHS disposed outside the boundaries of room 100. In other cases, once the location of a given IHS in room 100 is determined (e.g., using method 600), a speaker array may specifically direct the ultrasonic signal toward the given IHS.

At 802, a user enters meeting room 100. At 803, the user's IHS (e.g., IHS 104A) receives the in-room broadcast via an ultrasonic signal or other proximity technologies. At 804, IHS 104A verifies whether the meeting ID of an ongoing or upcoming meeting matches a meeting recorded in the user's calendar or email applications. It not, method 800A ends at 805.

Otherwise, at 806, IHS 104A may provide or render a control GUI to the user with a selectable list of parameters or options, such as those included in the ultrasonic signal. At 807, the user selects one or more options, which sends a corresponding message to OTB agent 501. For example, the user may select a video cast option whereby IHS 104A derives a WiFi hostname from the meeting room context, connects to a wireless display, and starts a screencast session.

At 808, OTB agent 501 sends a command to a room resource to implement the user's selection (e.g., an Audio Digital Signal Processor or "ADSP," a graphics or controller, a room lighting controller, etc.).

Method 800B begins at 809, upon the user leaving room 100, for example, as detected using method 600. At 810, IHS 104A no longer receives the ultrasonic broadcast until a time-out event. In response, at 811, client IHS agent 510A purges the current meeting room context, at least in part, by invalidating the temporary meeting session key, so that the user is no longer able to control room resources. Method 800B ends at 812.

In some cases, an attendance policy may determine when (e.g., how often, contextual triggers, etc.) and how (e.g., by ultrasound) to take attendance or otherwise record the presence or absence of participants during a remote meeting.

In many situations, however, IHSs may provide their users with controls to mute (and unmute) its integrated microphone (e.g., 114A), for example, for privacy or security purposes (e.g., to prevent conversation-related information from inadvertent or malicious dissemination). Ordinarily, if the IHS's microphone is muted, methods 800A and 800B would not work because the IHS would not be able to receive the video bar 101's ultrasonic broadcast.

To address this, and other concerns, in some cases, in response to detecting a BT signal in the room (e.g., transmitted at 601 in FIG. 6), the ultrasonic signal may be received by an IHS regardless of whether the IHS's microphone is muted or not, without loss of privacy. For instance, if an IHS's microphone is muted, instead of turning or leaving the microphone off, client IHS agent 510A may leave the audio input channel, on and it may apply a high-pass filter to the captured signal configured to select ultrasonic frequencies to the exclusion of audible frequencies.

Figures 9A, 9B:
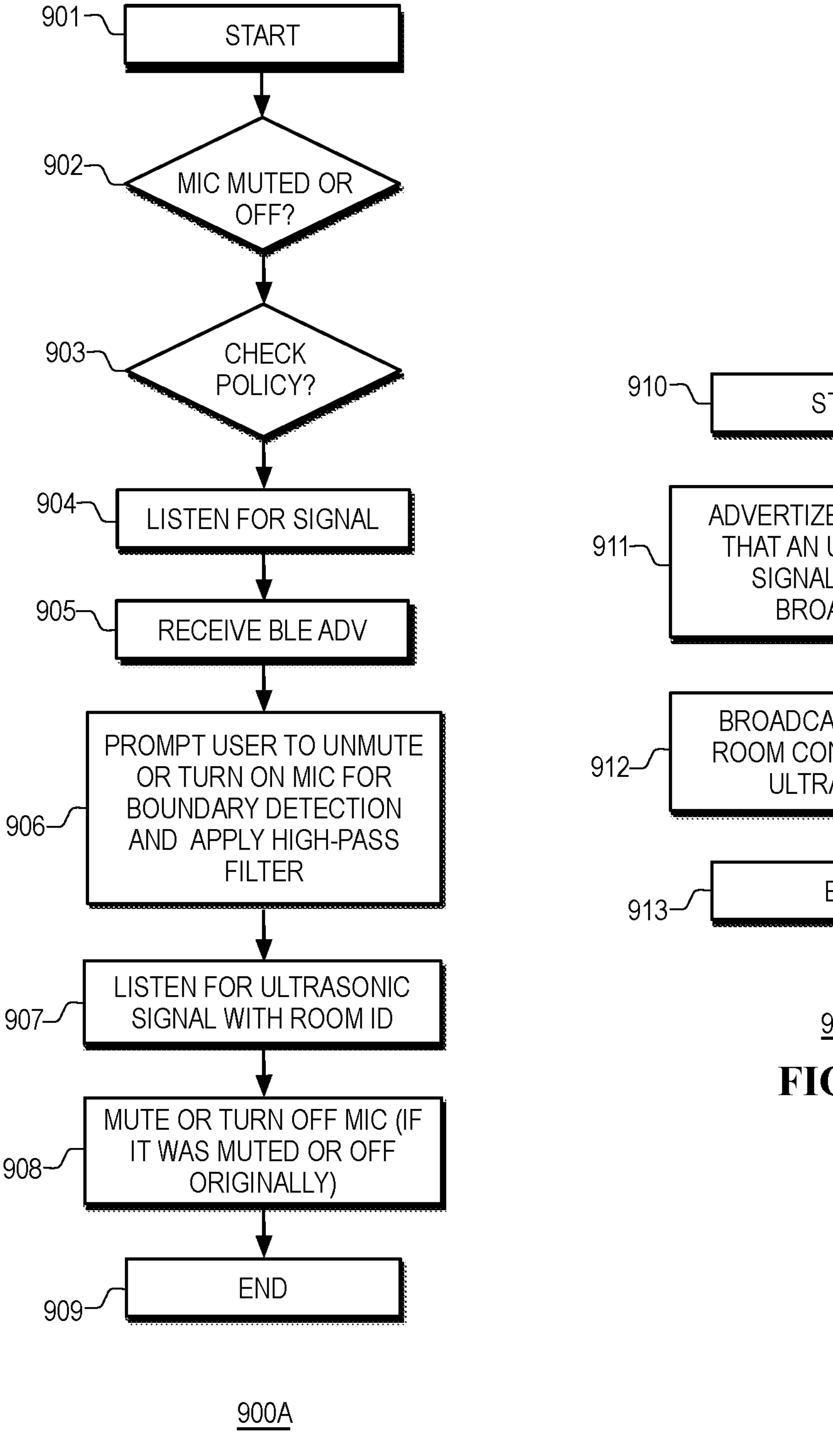
FIGS. 9A and 9B are diagrams illustrating examples of methods for handling conference room boundaries and/or context when a microphone is muted, according to some embodiments.

FIGS. 9A and 9B are diagrams illustrating examples of methods 900A and 900B for handling conference room boundaries and/or context when a microphone is muted. In various embodiments, methods 900A and 900B may be performed, at least in part, by components of architecture 700 of FIG. 7.

Method 900A begins at 901, where video bar 101 transmits an advertising signal, such as a BLE ADV signal (scannable, non-directed, and non-connectable) indicating the presence of an ultrasonic broadcast in room 100. At 902, client IHS agent 510A determines if the client IHS's microphone is muted or turned off.

At 903, client IHS agent 510A determines if the IHS's microphone may be used. For example, the user may be able to set a policy or setting to determine whether the client IHS's microphone may be temporarily enabled to receive ultrasound signals (when the client IHS's microphone is originally muted or turned off), and 903 client IHS agent 510A checks that policy.

At 904, if the policy allows, client IHS 104A may listen for the BLE ADV signal. In response to its detection at 905, client IHS 104A may turn the microphone on (or unmute it) temporarily using execution engine 702. At 906, If BLE ADV is detected by the IHS, a SCAN_REQ is sent, triggering video bar 101 to send a SCAN_RESP with the room or meeting ID.

At 906, if no policy has been set, method 900B may prompt the client IHS user to manually turn on the client IHS's microphone to perform meeting room detection, and it may apply a high-pass filter (e.g., with a cutoff frequency ~20 kHz) to the audio input channel.

At 907, the client IHS may listen for the ultrasonic broadcast containing a room or meeting ID. At 908, after having received the ultrasonic signal, the client IHS 104A may turn off (or mute) the microphone once again (e.g., via execution engine 702) before method 900A ends at 909 after a defined duration.

Method 900B begins at 910. At 911, video bar 101 transmits the BLE ADV signal indicating the presence (current or impending) of the ultrasonic broadcast in room 100. Then, in response to having received the SCAN_REQ of 906, at 912 video bar 101 broadcasts the ultrasonic signal with the meeting room context before method 900B ends at 913.

As such, these systems and methods may identify, collect, manage, and remove meeting room context across video bar 101, IHSs 104A-N, and other devices in connection with ongoing or upcoming remote meetings. In various implementations, these systems and methods may offer easy-to-use features that automate selected operations using the information received as meeting room context.

It should be noted that, in various embodiments, architecture 700 may be combined with components of other architectures described herein, and methods 800A, 800B, 900A, and 900B may be combined with operations of other methods described herein, to provide additional or alternative features.

As described herein, in an illustrative, non-limiting embodiment, a video bar may include a processor and a memory coupled to the processor, the memory having program instructions stored thereon that, upon execution by the processor, cause the video bar to: transmit an ultrasonic signal in a conference room, where the ultrasonic signal comprises at least one of: room data, meeting data, or a peripheral setting; and establish or maintain a connection with a client IHS, at least in part, in response to a message from the client IHS indicating receipt of the ultrasonic signal.

The room data may include an indication of at least one of: a room identifier, a list of devices present in the conference room, or a wireless credential. The program instructions, upon execution by the processor, cause the video bar to determine that a subsequent message from the client IHS has not been received in response to a subsequent ultrasonic signal and, in response to the determination, terminate the connection. To terminate the connection, the program instructions, upon execution by the processor, cause the video bar to invalidate the wireless credential.

Prior to the termination of the connection, the program instructions, upon execution by the processor, cause the video bar to request a user of the client IHS to provide an access code. The message may be received via: (i) an electrical or electromagnetic communication channel, or (ii) an ultrasonic communication channel. Moreover, the message may include an indication of the signal strength of the ultrasonic signal as received by the client IHS.

The program instructions, upon execution by the processor, cause the video bar to establish or maintain the connection, at least in part, in response to a determination that the signal strength meets or exceeds a threshold value. The determination may be performed, in part, in response to another determination that a location of the client IHS matches a direction of a door or window in the conference room.

The program instructions, upon execution, may cause the video bar to terminate the connection, at least in part, in response to a determination that the signal strength does not meet or exceed the threshold value or another threshold value.

The meeting data may include an indication of at least one of: a meeting identifier, a meeting application, a meeting duration, invited participants, or participants present in the conference room. The program instructions, upon execution by the processor, cause the video bar to determine, based at least in part upon one or more messages received from the client IHS, whether the meeting data matches calendar information of a user of the client IHS.

Also, the program instructions, upon execution by the processor, cause the video bar to terminate the connection, at least in part, in response to a determination that the meeting data does not match the calendar information.

The peripheral setting may include an indication of at least one of: a microphone mute/unmute setting, a room lighting setting, a shared display setting, or a shared camera setting. The client IHS may be configured to apply the peripheral setting to at least one of a plurality of peripheral devices disposed in the conference room.

The processor may be coupled to a host IHS external to the video bar, and to establish or maintain the connection, the program instructions, upon execution, cause the video bar to request the host IHS to establish or maintain the connection. The video bar or host IHS may be configured to maintain a virtual map of one or more client IHSs disposed in the conference room based, at least in part, upon the message.

In another illustrative, non-limiting embodiment, a hardware memory device may have program instructions stored thereon that, upon execution by a processor of a client IHS, cause the client IHS to: receive an ultrasonic signal from a video bar in a conference room, where the ultrasonic signal comprises a session key and the video bar is coupled to a host IHS; and in response to the ultrasonic signal, use the session key to establish or maintain a data connection with the video bar or the host IHS.

The program instructions, upon execution by the processor, may further cause the client IHS to a invalidate the session key in response to not having received a subsequent ultrasonic signal.

In yet another illustrative, non-limiting embodiment, a method may include: determining, at least in part using a video bar, a presence of an IHS with respect to a conference room; and at least one of: requesting an access code from a user of the IHS, at least in part, in response to the IHS being outside the conference room, or not requesting the access code from a user of the IHS, at least in part, in response to the IHS being inside the conference room.

In many situations, video bar 101 may connect to external devices, for example, to achieve broader coverage (e.g., additional display, additional camera/mic, etc.) and/or to allow a user to bring their personal IHS or peripherals for participating in a remote meeting (e.g., for presenting a video/deck). Ordinarily, however, these device additions are stateless and undergo no security checks, which creates security concerns (e.g., malware attacks, unauthorized device access, etc.).

Using systems and methods described herein, however, only known and trusted devices may be added to a conference room, and all other devices may be rejected. Additionally, or alternatively, these systems and methods may allow a device to connect to video bar 101 for a specific remote meeting, for a selected duration only (e.g., the reserved meeting time). In cases where the user brings their own IHS, these systems and methods may allow basic access (e.g., using an HDMI port, etc.) while other features are restricted (e.g., wireless connections).

Figure 10:
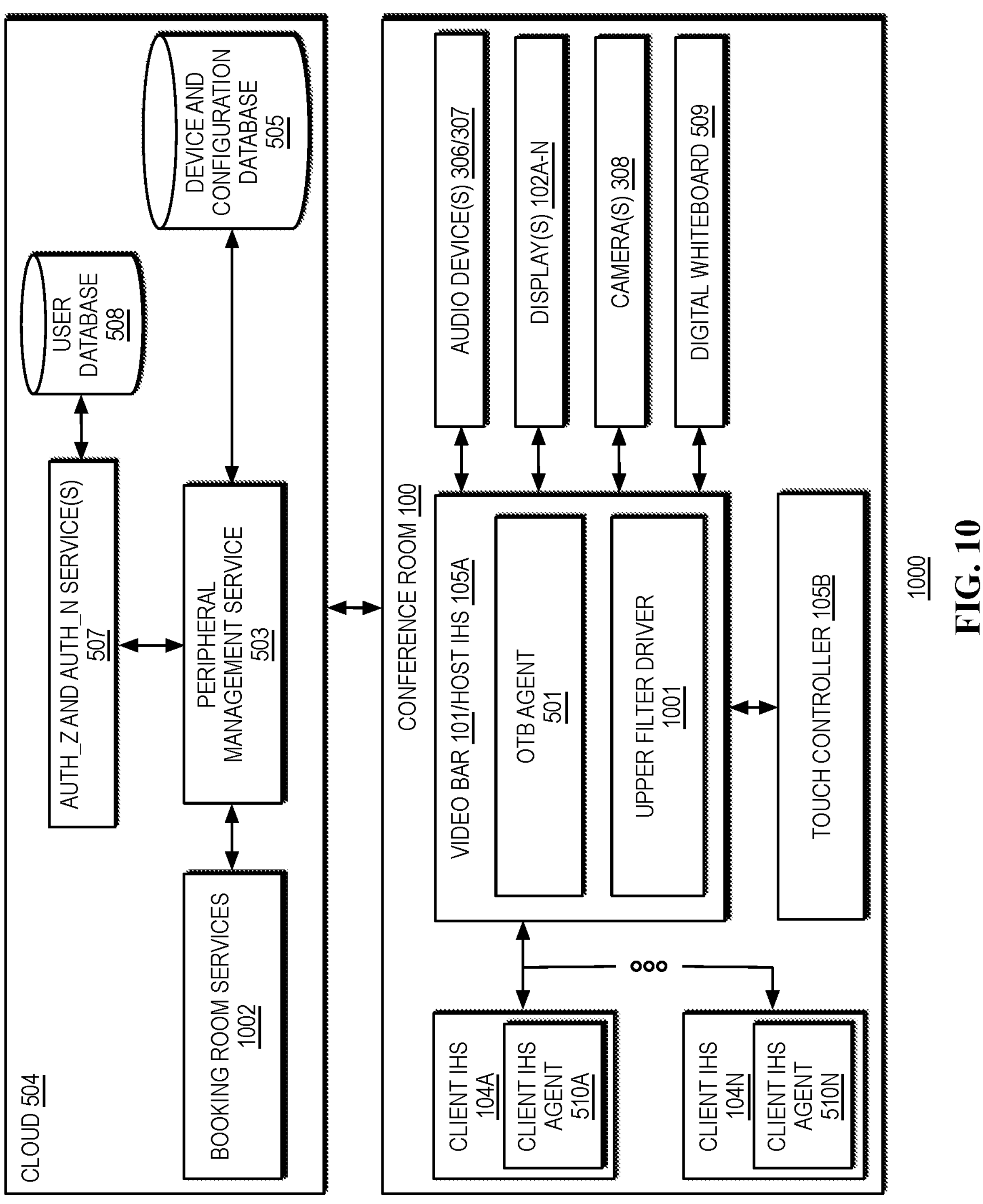
FIG. 10 is a diagram illustrating an example of an architecture usable for securely adding devices to a conference room, according to some embodiments.

FIG. 10 is a diagram illustrating an example of architecture 1000 usable for securely adding devices to a conference room. As shown, architecture 1000 includes certain components disposed in conference room 100 and others residing in cloud 504.

In this example, conference room 100 includes client IHSs 104A-N in communication with video bar 101 and/or host IHS 105A (client IHSs B-N are not shown). Each of IHSs 104A-N may be configured to execute a respective client IHS agent 510A-N. Video bar 101 and/or host IHS 105A may also include, or otherwise be coupled to, display(s) 102A-N, audio device(s) 306/207, camera(s) 308, digital whiteboard 509, and touch display or controller 105B. In other examples, however, other devices may be present in room 100 and one or more of the devices shown may be absent.

In room 100, video bar 101 and/or host IHS 105A are configured to implement, execute, or instantiate OTB agent 501 and upper filter driver 1001. Upper filter driver 1001 sits above a primary driver in the driver stack. In this case, upper filter driver 1001 may be configured to ensure that selected devices (e.g., all devices) have at least a subset of their functionality and/or features blocked (e.g., upon entering room 100). OTB agent 501 allows video bar 101 and/or host IHS 105A to communicate with peripheral management service 503 to receive information necessary to perform its operations. Meanwhile, IHS 104A is configured to implement, execute, or instantiate client IHS agent 510A.

On cloud 504, peripheral management service 503 is coupled to device and configuration database 505, room booking services 1002, and AuthZ and AuthN service(s) 507, which in turn are coupled to user database 508. Room booking services 1002 may enable users to schedule remote meetings, and it may keep a calendar with meeting details (e.g., meeting ID, time, duration, list of participants or attendees, required or optional participation for each attended, the role of each participant in the meeting, whether the meeting is expected to be confidential or privileged, whether session recording and/or transcription are allowed, a conference room ID, a location of the room, etc.).

Moreover, peripheral management service 503 may connect with AuthZ and AuthN service(s) 507 to access user information stored in user database 508. Additionally, peripheral management service 503 may maintain a list of trusted devices (e.g., IHSs that are part of the same corporate/enterprise) in device and configuration database 505.

Figure 11:
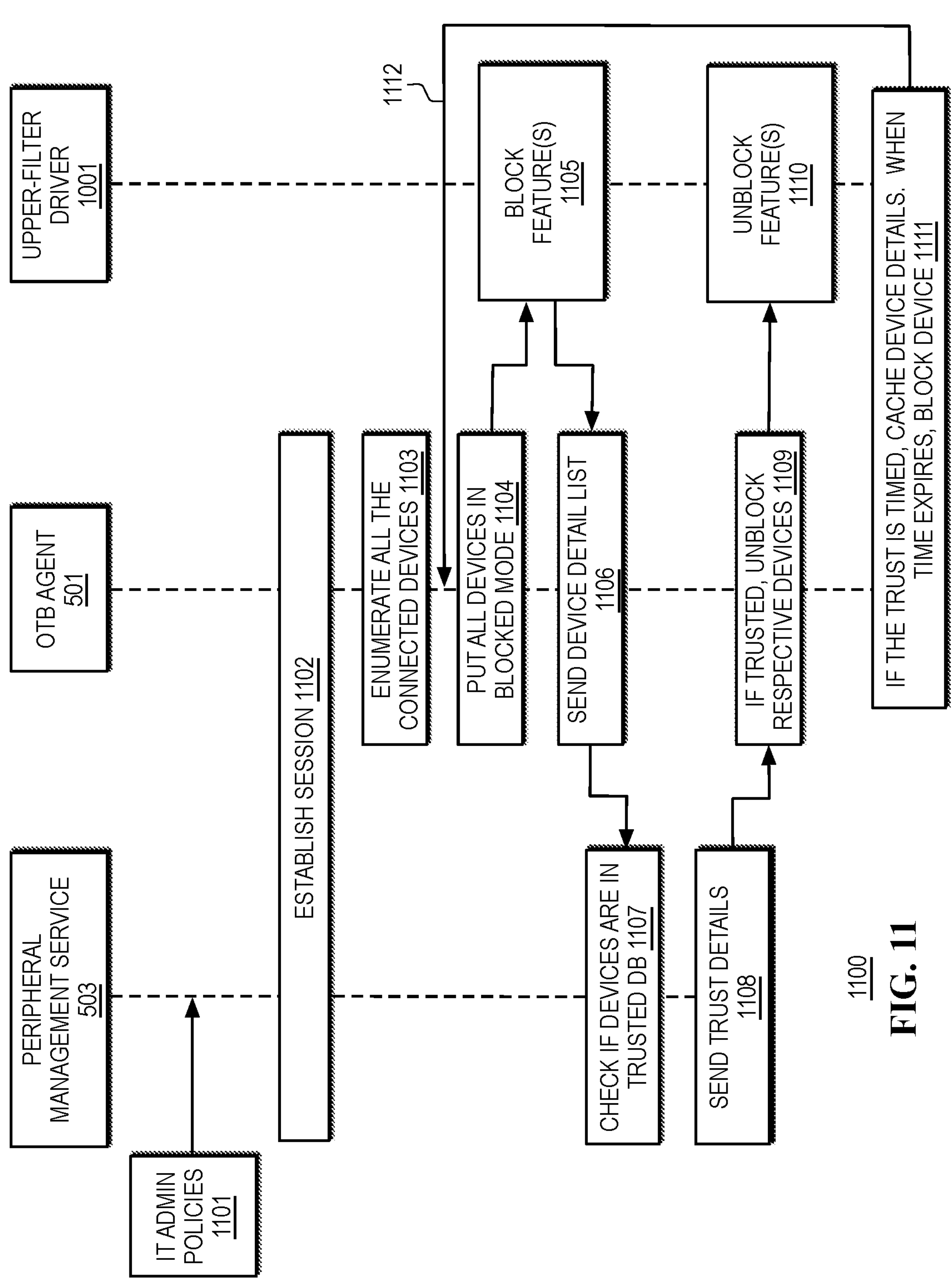
FIG. 11 is a diagram illustrating an example of a method for securely adding devices to a conference room, according to some embodiments.

FIG. 11 is a diagram illustrating an example of method 1100 for securely adding devices to a conference room. In various embodiments, method 1100 may be performed, at least in part, by components of architecture 1000 of FIG. 10.

Method 1100 begins at 1101, where peripheral management service 503 receives IT administrator policies. At 1102, peripheral management service 503 establishes a session with OTB agent 501 of video bar 101 and/or host IHS 105 based, at least in part, upon those policies.

Upon initialization, OTB agent 501 enumerates all connected devices but blocks their functionality and/or features using upper filter driver 1001 (e.g., by default). Particularly, at 1103, OTB agent 501 receives each of IHSs 104A-N's (and other devices') serial number, service tag, or other identifying information and enumerates those devices. At 1104, OTB agent 501 sends a command to upper filter driver 1101 to place the enumerated devices in blocked mode, and at 1105 upper filter driver 1101 executes the command to block selected features or functionality in the enumerated devices with respect to room 100.

At 1106, OTB agent 501 sends a device detail list to peripheral management service 503, and at 1107 peripheral management service 503 checks, against device and configuration database 505, if the devices on the list are trusted, for how long (e.g., trust time equal to the duration of a meeting, trusted for a day, etc.), and/or whether under a set of conditions or restrictions (e.g., allowed or forbidden features based upon contextual information, such as, for example, location of room 100, identity of users, type of remote meeting, participants of the meeting, etc.).

At 1108, peripheral management service 503 sends these trust details, for each device on the list, to OTB agent 501. To reduce delays, a list of previously trusted devices list may be cached. At 1109, for each device on the list, if a given device is trusted, OTB agent 501 sends a command to upper filter driver 1101 to unblock previously blocked functionality and/or features of the given device(s). At 1110, upper filter driver 1101 unblocks the functionality and/or features of the given device(s).

At 1111, if the trust of a given device is timed, OTB agent 501 may cache the device's details, and, upon expiration of the trust time, it may request upper filter driver 1101 to block the device (or a subset of its functionality and/or features) again. At 1112, method 1100 loops back to 1104 for any new devices connected to video bar 101 and/or host IHS 105A.

In some cases, if a device is not trusted to be permanently part of the conferencing room, but the user wants to use it, method 1100 may verify that the connected device is included in the user's device list, and that the user is part of an ongoing or upcoming remote meeting. If so, the user's device may be allowed to connect only for the duration of the session. Moreover, if the device is not a corporate device (e.g., Bring Your Own Device or "BYOD"), then only the reduced functionality and features may be allowed.

As such, systems and methods described herein provide the secure addition of one or more devices (both smart and non-smart devices) in a conferencing room solution. Moreover, these systems and methods provide the ability to scale for both corporate devices and BYODs.

It should be noted that, in various embodiments, architecture 1000 may be combined with components of other architectures described herein, and method 1100 may be combined with operations of other methods described herein, to provide additional or alternative features.

As described herein, in an illustrative, non-limiting embodiment, a video bar may include a processor and a memory coupled to the processor, the memory having program instructions stored thereon that, upon execution by the processor, cause the video bar to: prevent a client IHS from using a feature available in a conference room; and allow the client IHS to use the feature in response to a determination that at least one of: (i) the client IHS, or (ii) a user of the client IHS, is expected to be in the conference room.

The program instructions, upon execution, cause the video bar to prevent the client IHS from using the feature in response to having received a message, from the client IHS, comprising an identification of at least one of: (i) the client IHS, or (ii) the user of the client IHS. For example, the identification may include at least one of: a serial number, or a service tag.

To determine that the client IHS or the user is expected to be in the conference room, the program instructions, upon execution by the processor, cause the video bar to: compare the identification against a list of attendees of an ongoing or upcoming remote conferencing session, or receive results of the comparison from a cloud service. Moreover, to prevent the client IHS from using the feature, the program instructions, upon execution by the processor, may further cause the video bar to execute an upper-level filter driver.

The feature may include a feature of a peripheral device disposed in the conference room. The peripheral device may include at least one of: a shared display, a shared microphone, a shared speaker, or a shared camera.

Additionally, or alternatively, the feature may include a remote conferencing application feature. For example, the remote conferencing application feature may enable the client IHS to join a remote conferencing session. Additionally, or alternatively, the remote conferencing application feature may enable the client IHS to participate in one or more aspects of a remote conference session. For example, the one or more aspects may include: receiv(ing) video, transmit(ting) video, receiv(ing) audio, transmit(ting) audio, or shar(ing) an electronic file. Additionally, or alternatively, the remote conferencing application feature may enable recording of one or more aspects of the remote conferencing meeting.

To allow the client IHS to use the feature, the program instructions, upon execution, cause the video bar to allow the client IHS to use the feature for a selected amount of time.

The program instructions, upon execution by the processor, may cause the video bar to select the amount of time based, at least in part, upon an identification of at least one of: (i) the client IHS, or (ii) the user. Additionally, or alternatively, the program instructions, upon execution by the processor, cause the video bar to select the feature based, at least in part, upon an identification of at least one of: (i) the client IHS, or (ii) the user. Additionally, or alternatively, the program instructions, upon execution by the processor, cause the video bar to select the feature based, at least in part, upon a policy received from an Information Technology Decision Maker (ITDM).

In another illustrative, non-limiting embodiment, a hardware memory device may have program instructions stored thereon that, upon execution by a processor of a client IHS, cause the client IHS to: transmit an identification of at least one of: (i) the client IHS, or (ii) a user of the client IHS, to a video bar disposed in a conference room, where the video bar is configured to prevent the client IHS from using a device available in a conference room; and in response to the video bar having authenticated or authorized the identification, access the device. To prevent the client IHS from using the device, the video bar may be configured to execute an upper-level filter driver.

In yet another illustrative, non-limiting embodiment, a method may include: blocking a client IHS from using one or more peripheral devices available in a conference room; validating an identification of at least one of: (i) the client IHS, or (ii) a user of the client IHS, received by a video bar disposed in the conference room; and in response to the validation, allowing the client IHS to use at least a feature of the one or more peripheral devices. The feature may be selected, at least in part, based upon the identification.

In various embodiments, systems and methods described herein may integrate conference room solutions (e.g., video bar 101 and/or host IHS 105A) with the room booking services. These systems and methods may also implement zero-touch or seamless authentication mechanisms to ensure that users expected to participate in a remote meeting are in room 100 during the remote meeting, and/or that users not expected to participate in the remote meeting are not in room 100 during the remote meeting.

Specifically, using systems and methods described herein, video bar 101 and/or host IHS 105A may ensure that only a remote meeting's host or organizer and invited attendees are present in room 100 during the remote meeting. These systems and methods may authenticate meeting room users without requiring additional operations, such as tapping a badge or entering a password or code, so that the right user(s) can seamlessly use room 100. Video bar 101 and/or host IHS 105A may also prevent users who are not part of the meeting from barging in.

Depending upon a user's identification and/or other user information such as, for example: the role of the user in a remote meeting (e.g., as host/organizer or participant, as a presenting or non-presenting participant, as employee or contractor, etc.), the user's job rank or position in the enterprise (e.g., executive, manager, engineer, IT administrator, etc.), and so on, these systems and methods may selectively enable features within room 100 for that user.

In some cases, users may be associated with a group, and the aforementioned selective enablement of features may be performed based on the users' group, for every user in that group. Examples of features include, but are not limited to, access to peripheral devices (e.g., external displays, cameras, whiteboard, etc.), specific device features, UC application features (e.g., start or stop recording a session, share documents or GUI windows during the session, etc.), and so on.

Figure 12:
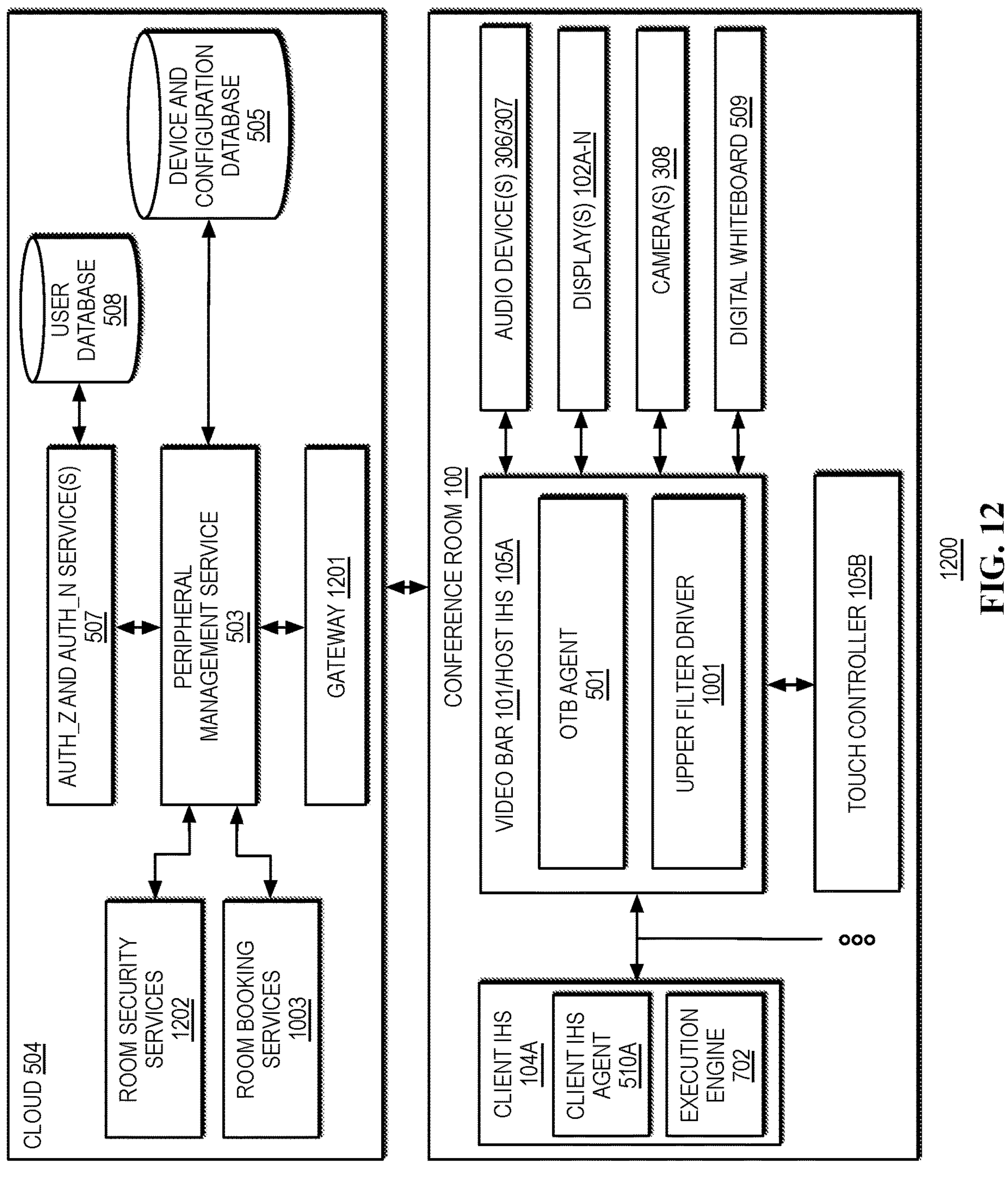
FIG. 12 is a diagram illustrating an example of an architecture usable for identifying and authenticating users in a conference room, according to some embodiments.

FIG. 12 is a diagram illustrating an example of architecture 1200 usable for identifying and authenticating users in a conference room. As shown, architecture 1200 includes certain components disposed in conference room 100 and others residing in cloud 504.

In room 100, video bar 101 and/or host IHS 105A are configured to implement, execute, or instantiate OTB agent 501 and upper filter driver 1001. OTB agent 501 allows video bar 101 and/or host IHS 105A to communicate with peripheral management service 503. Meanwhile, IHS 104A is configured to implement, execute, or instantiate client IHS agent 510A. In this environment, digital whiteboard 509 is also present in room 100 and coupled to video bar 101 and/or host IHS 105A.

On cloud 504, peripheral management service 503 is coupled to gateway 1201 and to device and configuration database 505, conference room security service 1202, and AuthZ and AuthN service(s) 507, which in turn are coupled to user database 508.

Gateway 1201 may be configured to expose various public APIs to devices located in room 100, and to perform conventional gateway operations (e.g., reverse proxy, load balancing, rate limiting, filtering traffic, etc.). Conference room security service 1202 may be configured to identify and verify users in room 100 along with AuthZ and AuthN service(s) 507.

Figure 13:
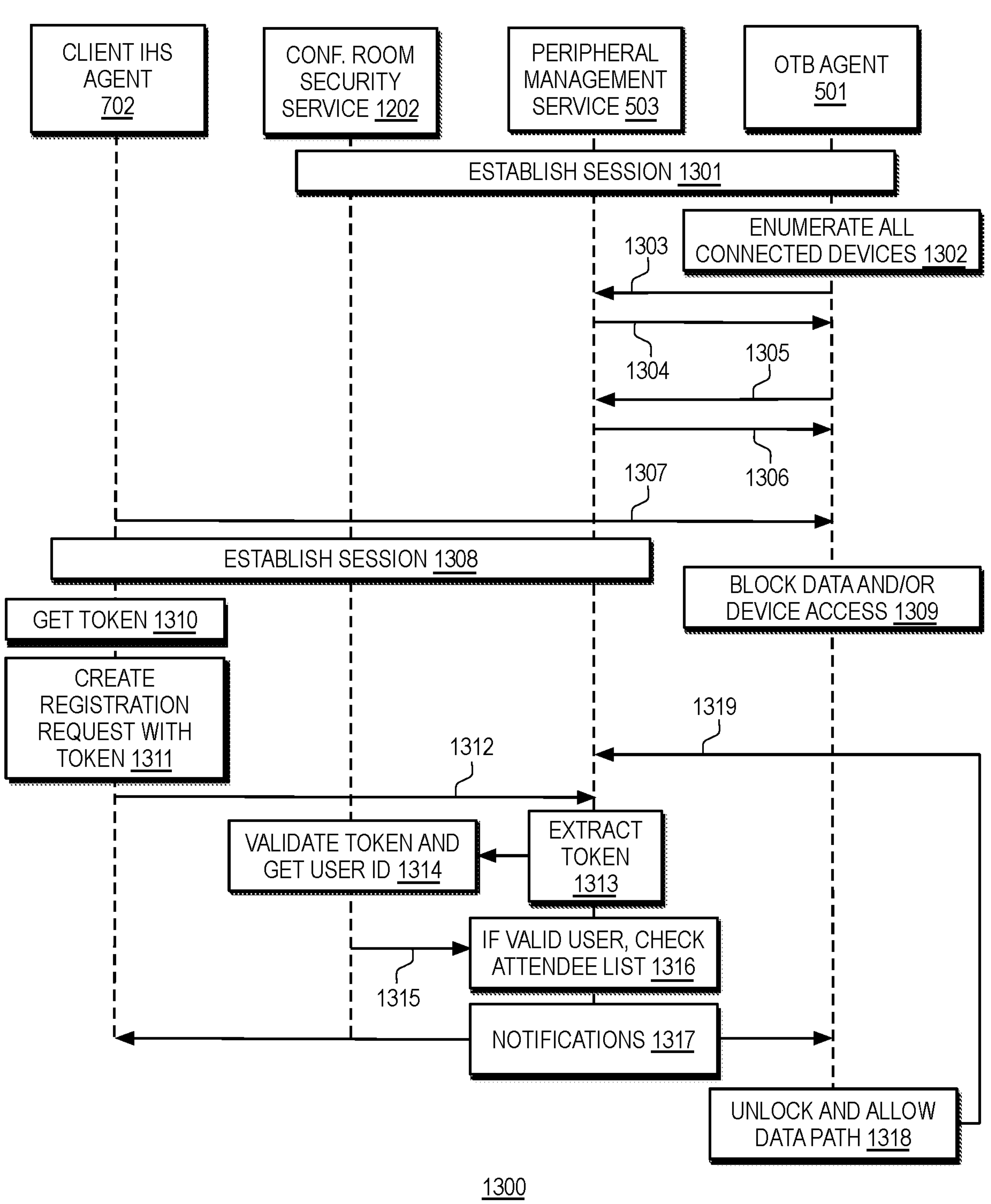
FIG. 13 is a diagram illustrating an example of a method for identifying and authenticating users in a conference room, according to some embodiments.

FIG. 13 is a diagram illustrating an example of method 1300 for identifying and authenticating users in a conference room. In various embodiments, method 1300 may be performed, at least in part, by components of architecture 1200 of FIG. 12.

Method 1300 includes initialization phase 1301-1306, followed by steady state 1307-1319. Particularly, method 1300 begins at 1301, where peripheral management service 503 establishes a session with OTB agent 501 of video bar 101 and/or host IHS 105, as well as conference room security service 1202.

At 1302, OTB agent 501 enumerates all connected devices. At 1303, OTB agent 501 registers the detected devices with peripheral management service 503, and at 1304 it receives an acknowledgement. Then, at 1305, OTB agent 501 sends information about the applications being used in room 100 and connected device capabilities and/or features to peripheral management service 503. At 1306, OTB agent 501 receives another acknowledgment before steady-state operation begins.

During steady state, at 1307, client IHS agent 510A connects to video bar 101 and/or host IHS 105A. At 1308, client IHS agent 510A establishes a session with peripheral management service 503 and conference room security service 1202. At 1309, OTB agent 501 blocks data and device access in room 100, for example, through upper filter driver 1101.

At 1310, client IHS agent 510A may get a token (e.g., a JSON Web Token or "JWT," a Security Assertion Markup Language or "SAML" token, etc.), for example, from AuthZ and AuthN service(s) 507 (or some other identity management service), and at 1311 it may create a registration request (e.g., a Hypertext Transfer Protocol or "HTTP" request) containing the token (e.g., in an HTTP header).

At 1312, client IHS agent 510A sends the registration request to peripheral management service 503. At 1313, peripheral management service 503 extracts the token from the request and sends it to conference room security service 1202. At 1314, conference room security service 1202 validates the token and retrieves a corresponding user ID, for example, from AuthZ and AuthN service(s) 507.

At 1315, conference room security service 1202 sends the user ID to peripheral management service 503. At 1316, peripheral management service 503 verifies, based upon the user ID, whether the user is valid and checks an attendee list, via room booking services 1003, for an ongoing or upcoming remote meeting. If the verification is successful, at 1317 peripheral management service 503 may send notifications to client IHS agent 510A and to OTB agent 501.

At 1318, OTB agent 501 unblocks the user's device (or eliminates/modifies feature restrictions imposed in 1311) and allows a data path to be established. The selection of which features to enable may be made based, at least, in part, upon the user ID, the role of the user in the remote meeting, the user's job or position in an enterprise, etc. For example, in some cases, a user who is a company executive may have access to a shared camera 308 (e.g., a Pan, Tilt, and Zoom or "PZT" camera), but whiteboard 509 is disabled, whereas another user who is an engineer may have access to whiteboard 509 while access to shared camera 308 is disabled. At 1319, method 1300 loops back to 1315 to process additional or newly connected devices.

As such, systems and methods described herein may enable video bar 101 and/or host IHS 105A to seamlessly (zero-touch) identify and authenticate a user and their IHS or devices upon connecting to room 100, and to selectively allow or block access to in-room devices and application features based upon the user. As with other systems methods described herein, these techniques may be scaled across different video bar and/or host IHS 105A's OSs, client IHS's OSs, and identity management systems (e.g., AZURE, AMAZON WEB SERVICES, etc.).

It should be noted that, in various embodiments, architecture 1200 may be combined with components of other architectures described herein, and method 1300 may be combined with operations of other methods described herein, to provide additional or alternative features.

In an illustrative, non-limiting embodiment, a video bar may include a processor and a memory coupled to the processor, the memory having program instructions stored thereon that, upon execution by the processor, cause the video bar to: prevent a client IHS from using a feature available in a conference room; and allow the client IHS to use the feature in response to a determination that: (i) a token provided by client IHS is valid, and (ii) a user of the client IHS is a participant of an ongoing or upcoming conference session.

The program instructions, upon execution, cause the video bar to prevent the client IHS from using the feature in response to having received a message, form the client IHS, comprising an identification of the client IHS. The identification may include at least one of: a serial number, or a service tag.

To determine that the user of the client IHS is a participant of an ongoing or upcoming conference session, the program instructions, upon execution by the video bar, cause the video bar to: retrieve an identification of the user based, at least in part, upon the token; and compare the identification of the user against a list of attendees of the ongoing or upcoming conference session. The token may be provided by the client IHS as part of an HTTP request.

The program instructions, upon execution, cause the video bar to allow the client IHS to use the feature at least in part, upon a determination that the user has a presenter, host, or organizer role in the ongoing or upcoming conference session. Additionally, or alternatively, the program instructions, upon execution, cause the video bar to allow the client IHS to use the feature at least in part, upon a determination that the user has a non-presenting participant role in the ongoing or upcoming conference session. Additionally, or alternatively, the program instructions, upon execution, cause the video bar to allow the client IHS to use the feature at least in part, upon a determination that the user belongs to a selected group or category of users the ongoing or upcoming conference session.

To prevent the client IHS from using the feature, the program instructions, upon execution by the processor, further cause the video bar to execute an upper-level filter driver. For example, the feature may include a feature of a peripheral device disposed in the conference room. The peripheral device may include at least one of: a shared display, a shared microphone, a shared speaker, or a shared camera.

The feature may include a remote conferencing application feature. The remote conferencing application feature may enable the client IHS to join a remote conferencing session. Additionally, or alternatively, the remote conferencing application feature may enable the client IHS to participate in one or more aspects of a remote conference session. The one or more aspects may include: receiv(ing) video, transmit(ting) video, receiv(ing) audio, transmit(ting) audio, or shar(ing) an electronic file. Additionally, or alternatively, the remote conferencing application feature may enable recording of one or more aspects of the remote conferencing meeting.

To allow the client IHS to use the feature, the program instructions, upon execution, cause the video bar to allow the user to use the feature for a selected amount of time. The program instructions, upon execution by the processor, cause the video bar to select the amount of time based, at least in part, upon a role of the user in the ongoing or upcoming conference session.

In another illustrative, non-limiting embodiment, a hardware memory device may have program instructions stored thereon that, upon execution by a processor of a client IHS, cause the client IHS to: transmit a token from a client IHS to a video bar disposed in a conference room, where the video bar is configured to prevent the client IHS from accessing one or more features of the conference room, and where the token is usable to identify a user of the client IHS; and in response to the video bar having authenticated or authorized the token, access the one or more features depending upon a role of the user in an ongoing or upcoming conference session.

In yet another illustrative, non-limiting embodiment, a method may include: blocking a client IHS from using one or more conferencing features during an ongoing or upcoming conference session; validating a token received by a video bar disposed in the conference room, where the token is associated with a user of the client IHS; in response to the validation, identify a role of the user in the ongoing or upcoming conference session; and in response to the validation, allowing the client IHS to access the one or more conferencing features in accordance with the role of the user.

Various embodiments provide tools for firmware updates for devices in conference rooms. For instance, some example systems and methods may leverage portable user devices to monitor, diagnose, and fix operational issues with conference room devices. An example of a portable user device may include a laptop or other computing device, issued by an enterprise to an employee, where the portable user device may include an enterprise-approved image that is installed by an IT administrator. Of course, the scope of implementations is not limited to any particular device for use as a portable user device. For instance, a portable user device may include a tablet, smart phone, or other appropriate device.

In an example conference room, there may be shared devices such as a large-format display (e.g., 102 of FIG. 1), video bar/host 101 and 105, touch controllers 105B, audio devices 306/307, and the like. In one example solution, referred to as a "room solution", there may be a dedicated computer in the room connected to these devices, where the computer controls the devices and is connected to a network that is managed by an IT administrator. In another example solution, referred to as a "portable user device solution", a user may instead bring their own computer and connect it to the shared devices. Within the portable user device solution, there are some variations. In a network-connected variation, some devices are connected directly on the network with their own IP addresses. This enables the administrator to remotely manage these devices.

In a second variation, devices are not connected because either 1) the processor on the device is not capable or 2) security concerns dictate no connection. For instance, devices such as a microphone, a camera, or a monitor may have some processing capability and installed firmware but may not be "smart" enough to be connected directly to the network. Rather, in the second variation, it may be expected that the user would connect the portable user device to the conference room devices by a wired (e.g., USB) or wireless (e.g., BLUETOOTH) connection and then manage a conference session using software on the portable user device.

To keep devices up-to-date with the latest firmware and monitor the health of the devices, there are tools for IT administrators to remotely manage these devices for room solution and network-connected devices. However, for conference room devices that are not directly connected to the network, administrators may not have a central view of the device firmware versions or whether any of the devices have firmware issues. Administrators may instead rely on end users filing trouble tickets, which is a reactive approach. Such a scenario may be particularly acute in remote offices that lack their own IT administration personnel, as manual software upgrades for the devices in the conference rooms may be particularly inconvenient or costly.

Figure 14:
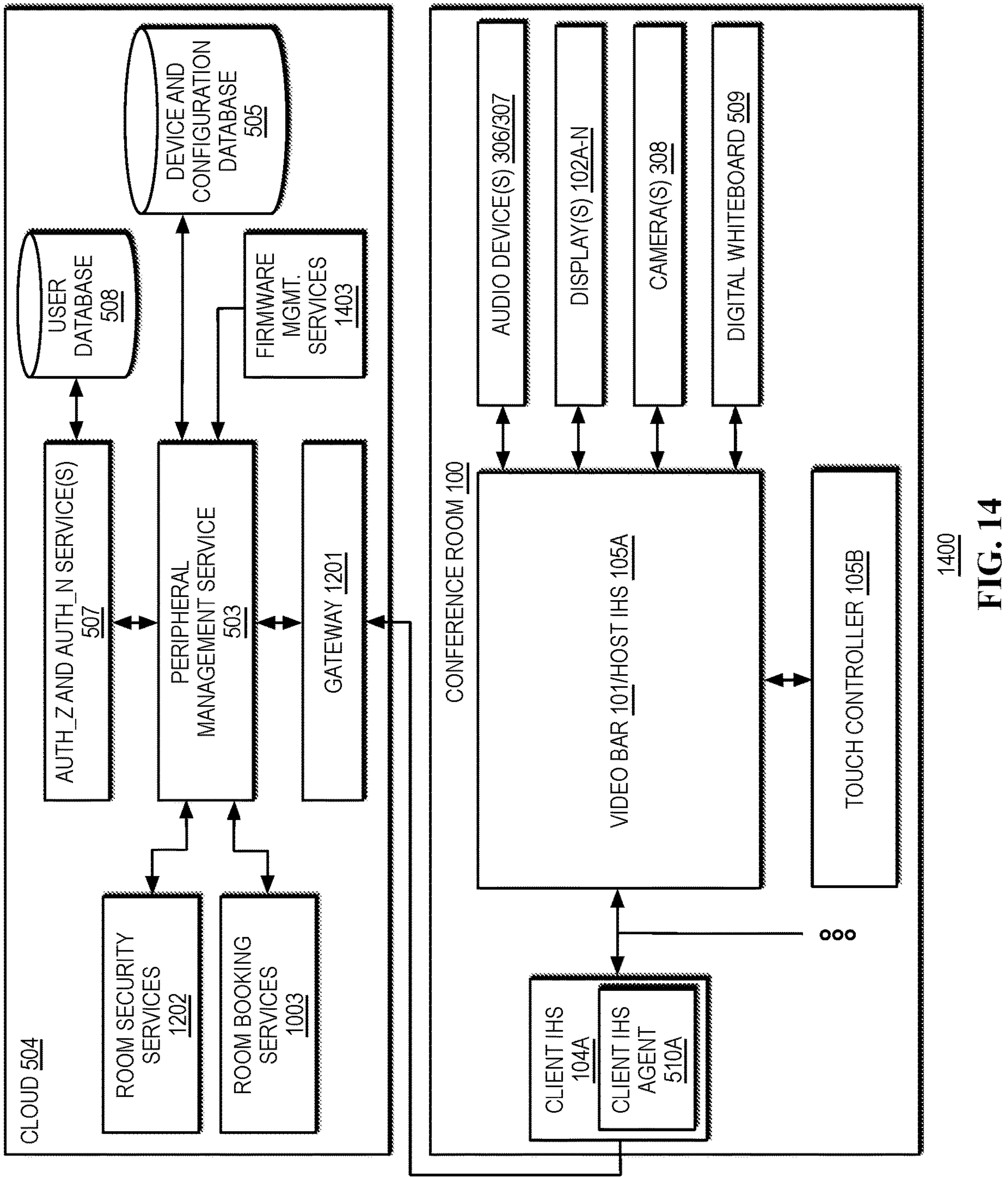
FIG. 14 is a diagram illustrating an example of an architecture usable for gathering information about a multitude of peripheral devices and applying firmware updates to those peripheral devices in a conference room, according to some embodiments.

FIG. 14 is a diagram illustrating an example architecture 1400 usable for monitoring, diagnosing, and remedying issues in a conference room. As shown, architecture 1400 includes certain components disposed in conference room 100 and others residing in cloud 504.

Example architecture 1400 includes a firmware management services module 1403, which is deployed in cloud 504. Firmware management services module 1403 communicates with peripheral management service 503. Furthermore, client IHS agent 510A, in this example, is additionally configured to perform the actions of method 1500 of FIG. 15. Conference room 100 may include other client IHSs 104, which may include their own client IHS agents 510, but in this example client IHS 104A is a portable user device, and its corresponding client IHS agent 510A is configured as described in more detail below.

Further in the example of FIG. 14, the conference room devices (e.g., video bar 101/host IHS 105A, touch controller 105B, audio devices 306/307, displays 102, camera 308, digital whiteboard 509) are not directly connected to the cloud 504 via a network. Rather, the client IHS 104A is network-connected to cloud 504. For instance, the client IHS 104A may be an employer-issued device having software installed and managed by an IT administrator. For example, the client IHS agent 510A may be a software application that is installed and managed by an IT administrator and may include functionality to monitor conference room devices, diagnose issues with those devices, and remedy those issues. When the user is in a conferencing session, the user may employ a wired or wireless connection to the video bar 101/host IHS 105A and/or any of the other conference room devices. The client IHS 104A may then interact with those conference room devices by the wired or wireless connection.

Furthermore, while the examples herein specifically refer to a conference room environment, the scope of implementations is not limited to a conference room. For instance, various embodiments may be adapted to use in shared workspaces. In one example, a shared workspace may include a monitor, a docking station, a keyboard, a mouse, or any other appropriate office peripherals. A user may then be expected to use a wired or wireless connection with the docking station for client IHS 104A to use the various peripherals. The architecture and methods described herein may be used to monitor the peripherals, diagnose issues with the peripherals, and remedy those issues as appropriate.

Figures 15, 16:
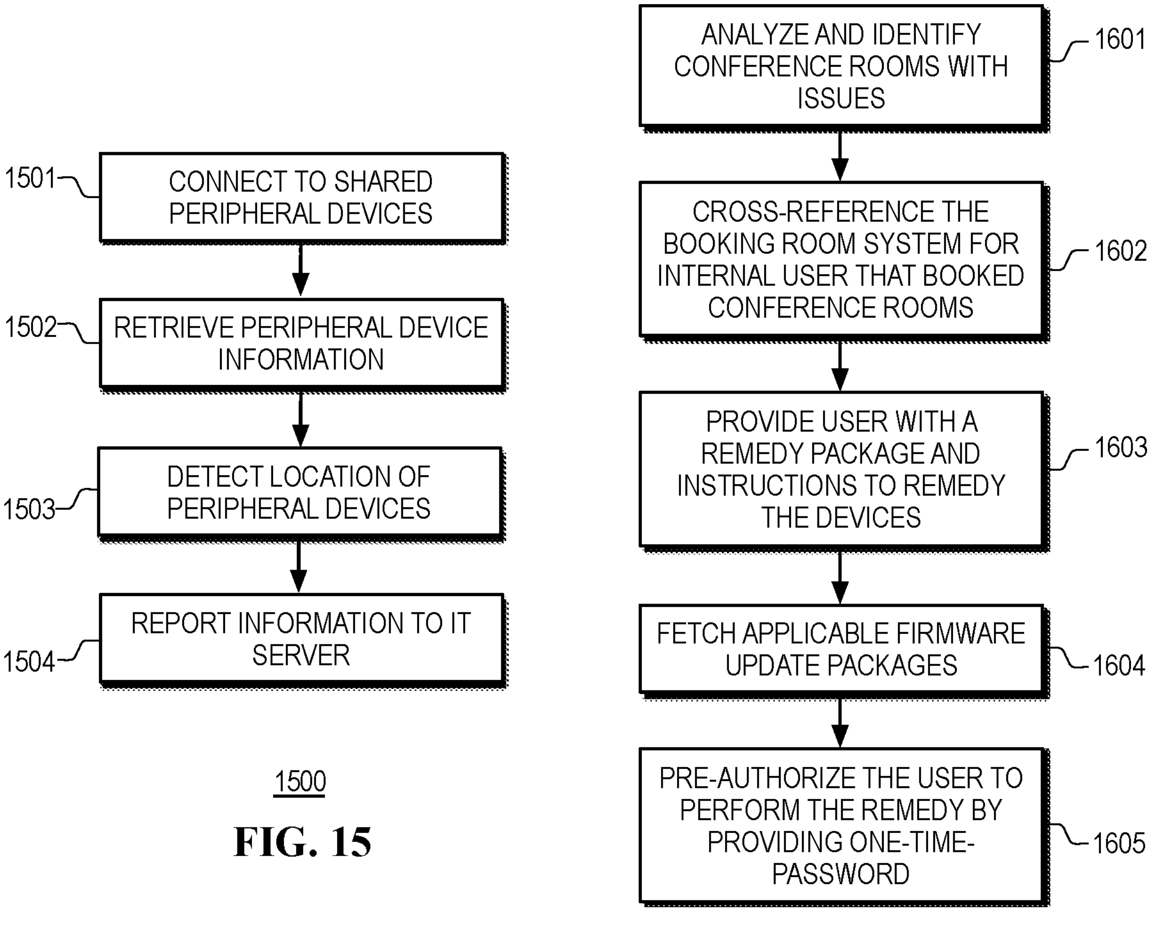
FIG. 15 is a diagram illustrating an example of a method for gathering information about a multitude of shared devices in a conference room or shared workspace, according to some embodiments.
FIG. 16 is a diagram illustrating an example of a method for applying firmware updates to a multitude of shared devices in a conference room or shared workspace, according to some embodiments.

FIG. 15 is a diagram illustrating an example method 1500 for remotely monitoring and diagnosing issues in a conference room. In various embodiments, method 1500 may be performed, at least in part, by client IHS agent 510A of FIG. 14.

At action 1501, the client IHS 104A, which in this example is a portable user device, connects to shared peripherals. For instance, as noted above, the client IHS 104A may use a wired or wireless connection to functionally interface with the conference room devices.

Further in this example, the client IHS 104A may connect to a secured network and the cloud 504, such as by using a login string and password. During the login process, any appropriate login procedure may be used, such as authenticating via the authentication services 507, and perhaps even identification via the room security services 1202. In any event, the client IHS 104A, and its corresponding client IHS agent 510A, are logged in securely to the cloud 504 and are in communication with video bar 101/host 105A and cloud 504.

At action 1502, the client IHS agent 510A may then detect firmware versions and health statuses of the various peripherals. In one example, the client IHS agent 510A includes a background check or process, which runs on the client IHS 104A in the background and is triggered by detection of shared peripherals. Further in this example, the shared peripherals may include the touch controller 105B, audio devices 306/307, the displays 102, cameras 308, digital whiteboard 509, and the like.

The background checker may then iterate through the various peripheral devices and discover the presence of a given peripheral device, its current firmware version, and its health status. For instance, the client IHS agent 510, and its associated checker functionality, may use one or more APIs or other appropriate communication techniques to detect the peripheral devices and to gather information from those peripheral devices.

At action 1503, the client IHS agent 510A may detect the location of the conference room devices, such as by the name of the conference room. In one example, the client IHS agent 510A may communicate with the room booking services 1003, via the OTB agent 501 and peripheral management service 503, to acquire information about the conference room. Additionally or alternatively, the client IHS agent 510A may retrieve conference room information from a meeting calendar, from the firmware of the various peripheral devices, or by manual entry from a user through a graphical user interface (GUI). The client IHS agent 510A may gather information about the conference room location using any appropriate technique.

At action 1504, the client IHS agent 510A may communicate with the firmware management services module 1403, via OTB agent 501 and peripheral management service 503. The client IHS agent 510 may report to the firmware management services module 1403 various information regarding the conference room and the peripherals. Such information may include the meeting room location and/or name, unique identifiers of peripheral devices, firmware versions of those peripheral devices, health status information of those peripheral devices, and the like.

As a result of method 1500, the firmware management services module 1403 has acquired information regarding the health statuses and firmware versions of peripheral devices within the conference room 100. Some example embodiments may include firmware management service 1403 storing the retrieved information within database 505 for later access. However, the scope of implementations is not limited to any particular way of storing, reading, or writing the data gathered from the peripheral devices within conference room 100. In one aspect, peripheral management service 503 has leveraged the presence of a portable user device (client IHS 104A) to crowdsource information about the peripheral devices.

FIG. 16 is a diagram illustrating an example method 1600 for remedying issues in a conference room. In various embodiments, method 1600 may be performed, at least in part, by components of architecture 1400, such as firmware management services module 1403.

At action 1601, the firmware management services module 1403 analyzes and identifies conference rooms with operation issues. For instance, some conference rooms may have peripheral devices having outdated firmware and/or performance degradation or malfunction. The firmware management services module 1403 may acquire such information from, e.g., a portable user device, such as described above with respect to method 1500. Specifically, the firmware management services module 1403 may have acquired health status information and firmware version information regarding the peripheral devices. The firmware management services module 1403 may parse that information and determine which devices have less than optimal health status and which devices are due for firmware updates.

At action 1602, the firmware management services module 1403 may begin searching for appropriate users to remediate the various issues. In one example, the action 1602 may include cross-referencing booking room services 1003 to determine which users have booked conference room 100. Action 1602 assumes that an internal user, who has booked conference room 100, is a trusted user for providing remediation. As noted with respect to method 1500, the user of a portable user device (e.g., client IHS 104A) may have been authenticated successfully and, thus, may be trusted. However, it is within the scope of implementations for the firmware management services module 1403 to select a different user having a different client IHS 104 instead of, or in addition to, choosing the user of client IHS 104A to perform remediation. Furthermore, methods 1500 and 1600 may be performed in quick succession, such as by the same user in the same meeting room in what feels to the user like a single transaction. In another example, method 1500 may be performed not just for conference room 100, but for a multitude of different conference rooms, with peripheral device information gathered by firmware management services 1403 and saved to database 505. IT administration may then perform method 1600 for ones of the various conference rooms at a later time, perhaps weekly or monthly or some other appropriate amount of time.

At actions 1603 and 1604, the firmware management services module 1403 provides the user with items for performing remediation. For instance, the firmware management services module 1403 may generate a remedy package and instructions to remedy the devices, such as gathering software updates, security packages, and the like. Action 1603 may include providing the user with the remedy package and instructions on how to apply the remedy package. Additionally or alternatively, action 1604 may include fetching an applicable firmware update package and providing the firmware update package to the user.

Actions 1603 and 1604 may be performed in any appropriate manner. For instance, actions 1603 and 1604 may be performed within client IHS agent 510A, with the instructions and any appropriate software updates being provided within the client IHS agent 510A. In another example, actions 1603 and 1604 may include actions outside of client agent 510A, such as requesting that the user access some update packages using a web browser or other appropriate application. Furthermore, update packages may include instructions for the user, such as providing explicit instructions for acquiring the updates and applying the updates, providing URLs for updates, and the like.

Action 1605 may include providing the selected user with permission to perform a remediation operation on a particular peripheral device. For instance, the user may be pre-authorized by receiving a one-time password from the firmware management services module 1403. In one example, the one-time password may be provided to the user out of band, such as through email, text message, or other appropriate method. Nevertheless, embodiments that require the user to be securely logged into cloud 504 may provide some amount of security regardless of whether the user is further required to use a one-time password. The scope of implementations may include any kind of authorization for the selected user.

As a result of method 1600, a user, present at conference room 100 and having a device (e.g., client IHS 104A), has items for performing a remediation operation, such as those described above with respect to action 1603-1605.

Although not specifically illustrated, further actions may include the user performing a remediation operation on a given peripheral device. For instance, the user may apply a remedy package, according to the instructions from action 1603, by applying a firmware update, such as acquired at action 1604, and using credentials acquired at action 1605.

In one non-limiting embodiment, a method includes connecting a user device to a plurality of shared peripheral devices in a conference room or shared workspace. An example includes the client IHS 104A and its client IHS agent 510A connecting by a wired or wireless connection to a plurality of peripheral devices, such as those illustrated with respect to conference room 100. The method may further include establishing a network connection with the cloud-based management service. An example of a cloud-based management service may include peripheral management service 503 and/or firmware management services 1403. The network connection may include a secured or unsecured connection over, e.g., the Internet. In this example, the management service is pre-populated with data regarding the plurality of shared peripheral devices and a plurality of conference rooms or shared workspaces. For instance, the peripheral management service 503 and/or the firmware management services 1403 may have access to a database (e.g., database 505), which includes information identifying a plurality of conference rooms or shared workspaces and also identifies a multitude of different peripheral devices associated with various respective conference rooms or shared workspaces. In one example, the firmware management services 1403 may have access to information indicating firmware updates or other patches available for various ones of the peripheral devices.

Continuing with the example, the method may further include retrieving firmware version information from the plurality of shared peripheral devices and gathering location information for the peripheral devices. For instance, the user device may be able to poll the different peripheral devices in the conference room, via its wired or wireless connection, for information stored at each one of the peripheral devices. The user device may gather location information from the peripheral devices themselves, from user input, from a calendar application, or any other appropriate technique.

Further in the example, the method may include transmitting the firmware version information and the location information to the cloud-based management service over the network connection. For instance, the client IHS agent 510A may transmit such information over a network connection to the cloud 504 and, more specifically, to the peripheral management service 503 and/or the firmware management services 1403.

In another non-limiting example, a method may include analyzing information regarding a plurality of conference rooms under management by a cloud-based management service. For instance, such actions may be performed by the peripheral management service 503 and/or the firmware management services 1403. Analyzing the information may include identifying a first conference room having a plurality of peripheral devices, wherein the first peripheral device of the plurality of peripheral devices is identified as malfunctioning by the information. For instance, the cloud-based management service may search a database or other appropriate data structure, which stores data, such as the data gathered as described with respect to FIG. 15. The cloud-based management service may use any particular technique to search the data structure and identify the first conference room, having the plurality of peripheral devices, and having at least a first peripheral device that is identified as malfunctioning. Examples of malfunctioning may include a loss of operation, a past due patch, a past due firmware update, or the like.

The method may further include searching a plurality of conference room bookings to determine an identity of a user who has booked the first conference room. In one example, the cloud-based management service may communicate with a room booking service, a conferencing room service, or other appropriate application to acquire information regarding upcoming room bookings and identities of users who have booked the first conference room.

The method may further include the cloud-based management service coordinating with the identified user to apply a remediation package to the first peripheral device. Applying the remediation package may employ a physical presence of a user device associated with the user in the conference room. For instance, since the first peripheral device is not configured for network communication, the cloud-based management service may rely on the user device to use a wired or wireless connection at the conference room or nearby the conference room (or at least being physically present with the first peripheral device).

Continuing with the non-limiting example, the method may further include proceeding with coordinating with the user only upon receiving permission from the user.

Continuing with the non-limiting example, the method may further include pre-authorizing the user to apply the remediation package to the first peripheral device. Assuming that the user device has a secure application to communicate with both the cloud-based management service and the first peripheral device, the pre-authorizing may be done purely between the application and the cloud-based management service. In another example, the cloud-based management service may provide authorization in the form of a one-use password or token through an out of band communication, such as by email or text.

Various embodiments may further include an IHS having one or more processors and a memory coupled to the one or more processors, wherein the memory comprises computer-readable instructions, which upon execution by the one or more processors, causes the IHS to perform a method, such as the methods described above with respect to FIGS. 14-16. In yet another embodiment, a non-transitory computer-readable storage device may have instructions stored thereon for peripheral device remediation, wherein execution of the instructions by one or more processors of an IHS causes the one or more processors to perform a method, such as any one of the methods described above with respect to FIGS. 14-16.

To implement various operations described herein, computer program code (i.e., program instructions for carrying out these operations) may be written in any combination of one or more programming languages, including an object-oriented programming language such as Java, Smalltalk, Python, C++, or the like, conventional procedural programming languages, such as the "C" programming language or similar programming languages, or any of ML/AI software. These program instructions may also be stored in a computer readable storage medium that can direct a computer system, other programmable data processing apparatus, controller, or other device to operate in a particular manner, such that the instructions stored in the computer-readable medium produce an article of manufacture including instructions which implement the operations specified in the block diagram block or blocks.

Program instructions may also be loaded onto a computer, other programmable data processing apparatus, controller, or other device to cause a series of operations to be performed on the computer, or other programmable apparatus or devices, to produce a computer-implemented process such that the instructions upon execution provide processes for implementing the operations specified in the block diagram block or blocks.

Modules implemented in software for execution by various types of processors may, for instance, include one or more physical or logical blocks of computer instructions, which may, for instance, be organized as an object or procedure. Nevertheless, the executables of an identified module need not be physically located together but may include disparate instructions stored in different locations which, when joined logically together, include the module and achieve the stated purpose for the module. Indeed, a module of executable code may be a single instruction, or many instructions, and may even be distributed over several different code segments, among different programs, and across several memory devices.

Similarly, operational data may be identified and illustrated herein within modules and may be embodied in any suitable form and organized within any suitable type of data structure. Operational data may be collected as a single data set or may be distributed over different locations including over different storage devices.

Reference is made herein to "configuring" a device or a device "configured to" perform some operation(s). It should be understood that this may include selecting predefined logic blocks and logically associating them. It may also include programming computer software-based logic of a retrofit control device, wiring discrete hardware components, or a combination of thereof. Such configured devices are physically designed to perform the specified operation(s).

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs.

As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

The invention claimed is:

1. An Information Handling System (IHS), comprising:

one or more processors; and a memory coupled to the one or more processors, wherein the memory comprises computer-readable instructions, that upon execution by the one or more processors cause the IHS to:

analyze information regarding a plurality of conference rooms under management by a cloud-based management service, including identifying a first conference room having a plurality of peripheral devices, wherein a first peripheral device of the plurality of peripheral devices is identified as having a malfunction by the information regarding the plurality of conference rooms, and wherein the first peripheral device is not configured for network communication;

search a plurality of conference room bookings to determine an identity of a user who has booked the first conference room;

ask the user for permission to move forward with a remediation operation, directed to the malfunction, for the first peripheral device; and upon receiving permission from the user, coordinate with the user to apply a remediation package to the first peripheral device to remediate the malfunction, wherein applying the remediation package to the first peripheral device employs a physical presence of a user device, associated with the user, in the conference room.

2. The IHS of claim 1, wherein the remediation package includes instructions to apply a firmware update to the first peripheral device.

3. The IHS of claim 1, wherein the remediation package includes an update patch or firmware update code and instructions to apply the update patch or firmware update code.

4. The IHS of claim 1, wherein the remediation package includes instructions for the user to acquire an update patch or firmware update code using a web browser.

5. The IHS of claim 1, further comprising computer-readable instructions to cause the IHS to:

pre-authorize the user to apply the remediation package to the first peripheral device.

6. The IHS of claim 5, wherein the computer-readable instructions to cause the IHS to pre-authorize the user include computer-readable instructions to cause the IHS to:

send a one-time password to the user via out of band communication.

7. A non-transitory computer-readable storage device having instructions stored thereon for peripheral device remediation, wherein execution of the instructions by one or more processors of an IHS (Information Handling System) causes the one or more processors to:

analyze information regarding a plurality of conference rooms under management by a cloud-based management service, including identifying a first conference room having a plurality of peripheral devices, wherein a first peripheral device of the plurality of peripheral devices is identified as having a malfunction in the information regarding the plurality of conference rooms, and wherein the first peripheral device is not configured for network communication;

search a plurality of conference room bookings to determine an identity of a user who has booked the first conference room;

ask the user for permission to move forward with a remediation operation, directed to the malfunction, for the first peripheral device; and upon receiving permission from the user, coordinate with the user to apply a remediation package to the first peripheral device to remediate the malfunction, wherein applying the remediation package to the first peripheral device employs a physical presence of a user device, associated with the user, in the conference room.

8. The non-transitory computer-readable storage device of claim 7, further comprising instructions to cause the one or more processors to:

gather the information regarding the plurality of conference rooms from a plurality of user devices.

9. The non-transitory computer-readable storage device of claim 7, wherein the remediation package includes instructions to apply a firmware update to the first peripheral device.

* * * * *